US012107435B2

(12) United States Patent
Choi

(10) Patent No.: US 12,107,435 B2
(45) Date of Patent: Oct. 1, 2024

(54) PWM METHOD FOR WIRELESS CHARGING SYSTEM

(71) Applicant: Samsung Electronics Co., Ltd., Suwon-si (KR)

(72) Inventor: Hangseok Choi, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 29 days.

(21) Appl. No.: 18/191,512

(22) Filed: Mar. 28, 2023

(65) Prior Publication Data
US 2023/0238831 A1 Jul. 27, 2023

Related U.S. Application Data

(63) Continuation of application No. PCT/KR2021/012938, filed on Sep. 23, 2021.

(30) Foreign Application Priority Data

Sep. 29, 2020 (KR) ........................ 10-2020-0127421

(51) Int. Cl.
*H02J 50/12* (2016.01)
*H02J 50/80* (2016.01)
*H02M 7/5395* (2006.01)

(52) U.S. Cl.
CPC .............. *H02J 50/12* (2016.02); *H02J 50/80* (2016.02); *H02M 7/5395* (2013.01); *H02J 2207/20* (2020.01)

(58) Field of Classification Search
CPC ........ H02J 50/12; H02J 50/80; H02J 2207/20; H02M 7/5395
See application file for complete search history.

(56) References Cited

U.S. PATENT DOCUMENTS 9,276,413 B1  3/2016 Zhang
9,812,856 B2  11/2017 Lee et al.
(Continued)

FOREIGN PATENT DOCUMENTS

JP           6425183 B2    11/2018
KR  10-2012-0132355 A     12/2012
(Continued)

OTHER PUBLICATIONS

International Search Report dated Jan. 3, 2022, issued in International Patent Application No. PCT/KR2021/012938.

*Primary Examiner* — Carlos Amaya
(74) *Attorney, Agent, or Firm* — Jefferson IP Law, LLP

(57) ABSTRACT

An electronic device utilizing a wireless charging system is provided. The electronic device includes a power source, a transmission coil, a full-bridge inverter electrically connected to the power source and the transmission coil, and a control circuit which communicates with an external device through the transmission coil, and controls the full-bridge inverter to transmit a power signal through the transmission coil. The control circuit may: receive, from the external device, a first control signal requesting that the power of the power signal be reduced to less than a specified power, in response to the first control signal, adjust the duty cycle of each of first to fourth gate signals for controlling the full-bridge inverter, and switch to a pulse width modulation (PWM) drive state in which an operation according to a first period and an operation according to a second period are alternately repeated.

20 Claims, 14 Drawing Sheets

(56) References Cited

U.S. PATENT DOCUMENTS

| | | |
|---|---|---|
| 10,193,392 B2 | 1/2019 | Bae |
| 10,579,916 B2 | 3/2020 | Liu et al. |
| 10,630,187 B2 | 4/2020 | Takahashi et al. |
| 10,651,688 B2 | 5/2020 | Karnstedt et al. |
| 10,651,689 B2 | 5/2020 | Karnstedt et al. |
| 10,910,878 B2 | 2/2021 | Lee et al. |
| 2014/0009109 A1 | 1/2014 | Lee et al. |
| 2018/0358841 A1 | 12/2018 | Park |
| 2019/0023134 A1 | 1/2019 | Cha et al. |
| 2019/0115788 A1* | 4/2019 | Zhang ............... H02M 3/33571 |
| 2019/0207570 A1 | 7/2019 | Govindaraj |
| 2019/0214852 A1 | 7/2019 | Park |
| 2019/0252920 A1 | 8/2019 | Campanella et al. |

FOREIGN PATENT DOCUMENTS

| | | |
|---|---|---|
| KR | 10-1764974 B1 | 8/2017 |
| KR | 10-2019-0009698 A | 1/2019 |
| KR | 10-2099819 B1 | 4/2020 |
| WO | 2018/004117 A1 | 1/2018 |

\* cited by examiner

PWM METHOD FOR WIRELESS CHARGING SYSTEM

CROSS-REFERENCE TO RELATED APPLICATION(S)

This application is a continuation application, claiming priority under § 365(c), of an International application No. PCT/KR2021/012938, filed on Sep. 23, 2021, which is based on and claims the benefit of a Korean patent application number 10-2020-0127421, filed on Sep. 29, 2020, in the Korean Intellectual Property Office, the disclosure of which is incorporated by reference herein in its entirety.

BACKGROUND

1. Field

The disclosure relates to an electronic device to which a wireless charging system is applied.

2. Description of Related Art

Recently, wireless charging or non-contact charging technology has been developed and applied to various electronic devices.

Wireless charging technology is a technology that may charge the battery of an electronic device without connecting the electronic device via wire to a charger, for example, it is a technology that may charge the battery by simply placing a smartphone or wearable device on a charging pad or a charging cradle.

Wireless charging technology is also being applied between electronic devices. For example, a first electronic device may operate in Tx mode to wirelessly transmit power by using power of the battery included therein, and a second electronic device may operate in Rx mode to wirelessly receive power from the first electronic device.

The above information is presented as background information only to assist with an understanding of the disclosure. No determination has been made, and no assertion is made, as to whether any of the above might be applicable as prior art with regard to the disclosure.

SUMMARY

In a wireless charging system to which wireless charging technology is applied, an electronic device that wirelessly transmits power may be defined as a wireless power transmitting device, and an electronic device that wirelessly receives power may be defined as a wireless power receiving device.

The wireless power receiving device may supply a power signal to a transmission coil by using a full bridge inverter circuit having four switches. The wireless power receiving device may receive the power signal through a reception coil and rectify the received power signal to charge a battery or supply system power.

Aspects of the disclosure are to address at least the above-mentioned problems and/or disadvantages and to provide at least the advantages described below. Accordingly, an aspect of the disclosure is to provide an electronic device to which a wireless charging system is applied.

Another aspect of the disclosure is to provide an electronic device that can, by preventing hard switching of four switches included in a full bridge inverter circuit and making root-mean-square (RMS) current values of the four switches uniform, prevent a decrease in reliability that may occur due to a relative increase in heat generation in a specific switch and ensure stable operation of the power supply.

Additional aspects will be set forth in part in the description which follows and, in part, will be apparent from the description, or may be learned by practice of the presented embodiments.

In driving the four switches included in the full bridge inverter circuit, the wireless power receiving device may adjust the power of the power signal by varying the driving frequency or controlling the duty cycle of the driving signals that control the four switches.

To reduce switching noise due to hard switching of the four switches included in the full bridge inverter circuit, the wireless power receiving device may use a scheme of shifting the phases of the driving signals or a scheme of asymmetrically controlling the duty cycles of the driving signals. However, in the above schemes, the asymmetry of current in the four switches included in the full bridge inverter circuit, for example, non-uniformity of the root-mean-square (RMS) current values of the four switches may result in relatively increased heat generation in a specific switch, which can deteriorate reliability in the long term.

In accordance with an aspect of the disclosure, an electronic device capable of wireless power transfer is provided. The electronic device includes a power source, a transmission coil, a full bridge inverter electrically connected to the power source and the transmission coil, and a control circuit configured to communicate with an external device through the transmission coil and control the full bridge inverter to transmit a power signal through the transmission coil, wherein the full bridge inverter may include: a first switch that is electrically connected to one end of the transmission coil and is turned on in response to a first gate signal of the control circuit, a second switch that is electrically connected to the one end of the transmission coil and is turned on in response to a second gate signal of the control circuit, a third switch that is electrically connected to the other end of the transmission coil and is turned on in response to a third gate signal of the control circuit, and a fourth switch that is electrically connected to the other end of the transmission coil and is turned on in response to a fourth gate signal of the control circuit, wherein the control circuit may be configured to: receive a first control signal requesting to lower a power of the power signal to less than a specified power from the external device, and adjust a duty cycle of each of the first to fourth gate signals in response to the first control signal, and switch to a pulse width modulation (PWM) driving state in which an operation corresponding to a first period and an operation corresponding to a second period are alternately repeated, wherein, during the first period, the control circuit may be configured to activate the first gate signal and the third gate signal, and deactivate the second gate signal and the fourth gate signal, where the duty cycle of the third gate signal is set to be greater than the duty cycle of the first gate signal, wherein, during the second period, the control circuit may be configured to activate the first gate signal and the third gate signal, and deactivate the second gate signal and the fourth gate signal, where the duty cycle of the first gate signal is set to be greater than the duty cycle of the third gate signal.

In accordance with another aspect of the disclosure, an electronic device capable of wireless power transfer is provided. The electronic device includes a power source, a transmission coil, a full bridge inverter electrically connected to the power source and the transmission coil, and a control circuit configured to communicate with an external device through the transmission coil and control the full bridge inverter to transmit a power signal through the transmission coil, wherein the full bridge inverter may include: a first switch that is electrically connected to one end of the transmission coil and is turned on in response to a first gate signal of the control circuit, a second switch that is electrically connected to the one end of the transmission coil and is turned on in response to a second gate signal of the control circuit, a third switch that is electrically connected to the other end of the transmission coil and is turned on in response to a third gate signal of the control circuit, and a fourth switch that is electrically connected to the other end of the transmission coil and is turned on in response to a fourth gate signal of the control circuit, wherein the control circuit may be configured to: receive a first control signal requesting to lower a power of the power signal to less than a specified power from the external device, and adjust a duty cycle of each of the first to fourth gate signals in response to the first control signal, and switch to a PWM driving state in which an operation corresponding to a first period and an operation corresponding to a second period are alternately repeated, wherein the control circuit may include: a demodulation circuit that obtains an error signal by demodulating the first control signal received through the transmission coil from the external device, a control compensation circuit that generates a control voltage by proportionally and integrally (PI) compensating the error signal, a limiting circuit that determines a maximum value of the control voltage and generates a duty control signal, a pulse generator that generates first to fourth pulses based on the maximum value of the control voltage and the duty control signal, and a dead time circuit that generates the first to fourth gate signals by applying a dead time of a specified length to the first to fourth pulses.

The electronic device according to various embodiments of the disclosure can prevent hard switching of four switches included in a full bridge inverter circuit and make RMS current values of the four switches uniform to thereby prevent a decrease in reliability that may occur due to a relative increase in heat generation in a specific switch and ensure stable operation of the power supply.

In addition, various effects identified directly or indirectly through this document may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
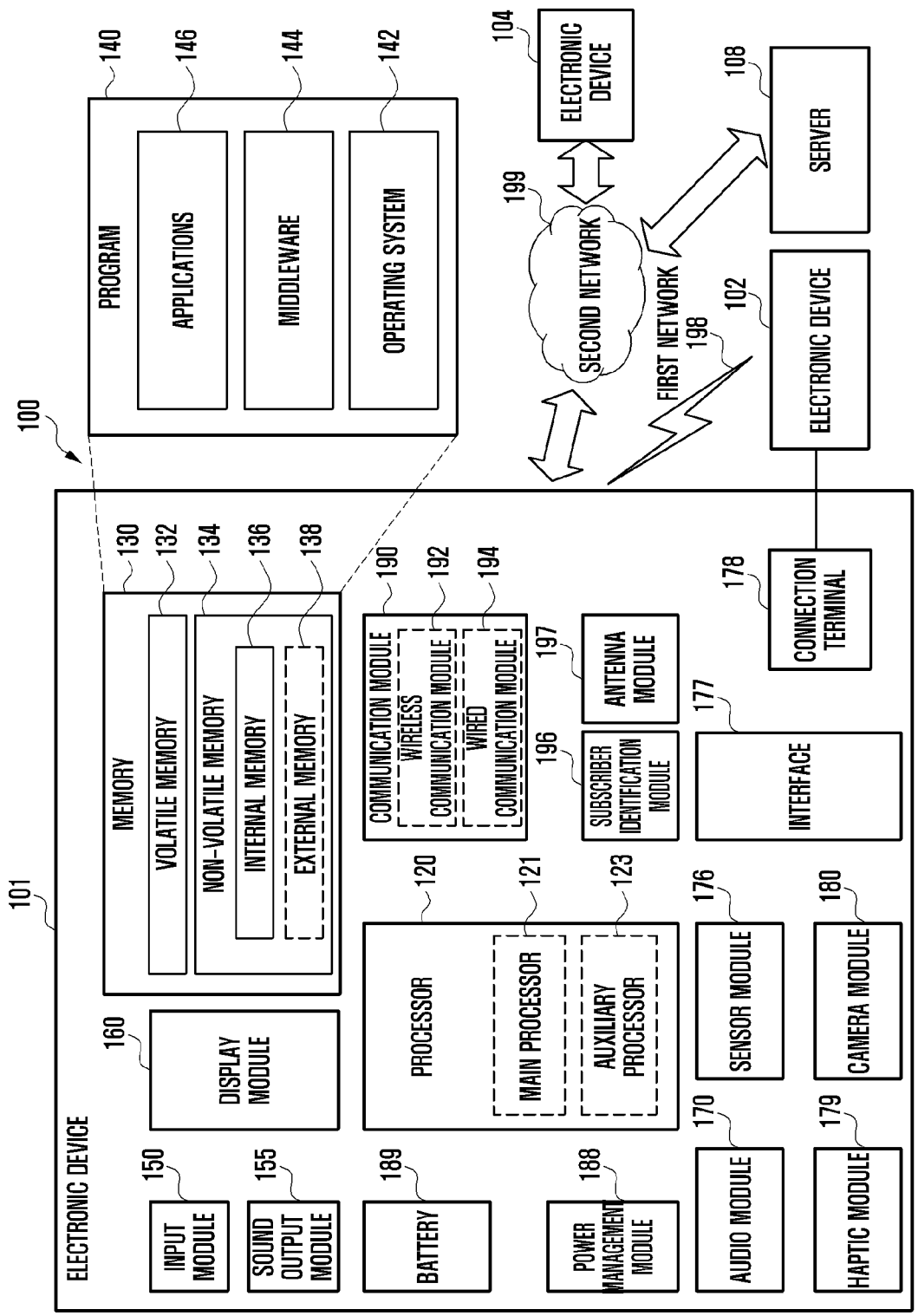
FIG. 1 is a block diagram of an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit, a neural processing unit (NPU), an image signal processor, a sensor hub processor, or a communication processor) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence model is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave band)) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102 or 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with/to" or "connected with/to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2:
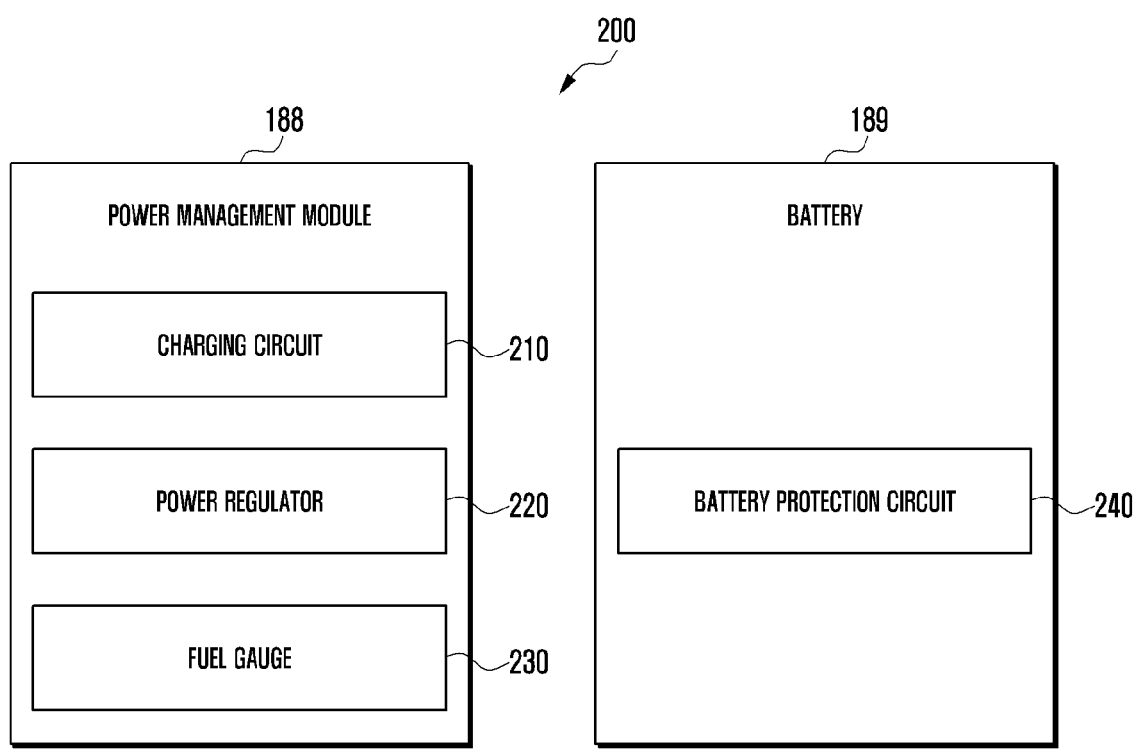
FIG. 2 is a block diagram of a power management module and a battery according to an embodiment of the disclosure.

FIG. 2 is a block diagram of a power management module and a battery according to an embodiment of the disclosure.

Referring to FIG. 2, the power management module 188 may include a charging circuit 210, a power regulator 220, or a fuel gauge 230. The charging circuit 210 may charge the battery 189 by using power supplied from an external power source for the electronic device 101. According to an embodiment, the charging circuit 210 may select a charging scheme (e.g., normal charging or rapid charging) based on at least some of the type of the external power source (e.g., power adapter, USB, or wireless charging), the amount of power available from the external power source (e.g., about 20 watts or more), or the attribute of the battery 189, and may charge the battery 189 by using the selected charging scheme. The external power source may be wiredly connected through a connection terminal (e.g., 178) or wirelessly connected through an antenna module (e.g., 197).

The power regulator 220 may generate a plurality of powers having different voltage levels or different current levels by adjusting a voltage level or a current level of the power supplied from the external power source or the battery 189. The power regulator 220 may adjust the voltage level or the current level of the power from the external power source or the battery 189 into a voltage level or current level appropriate for each of the components included in the electronic device 101. According to an embodiment, the power regulator 220 may be implemented in the form of a low drop out (LDO) regulator or a switching regulator.

The fuel gauge 230 may measure usage state information about the battery 189 (e.g., capacity, number of times of charging or discharging, voltage, or temperature of the battery 189).

The power management module 188 may determine, by using, for example, the charging circuit 210, the power regulator 220 or the fuel gauge 230, charging state information (e.g., lifetime, over voltage, low voltage, over current, over charge, over discharge, overheat, short, or swelling) related to the charging of the battery 189 based at least in part on the measured usage state information about the battery 189, determine whether the state of the battery 189 is normal or abnormal based at least in part on the determined charging state information, and adjust the charging of the battery 189 (e.g., reduce the charging current or voltage, or stop the charging) if the state of the battery 189 is determined to be abnormal. According to an embodiment, at least some of the functions of the power management module 188 may be performed by an external control device (e.g., processor 120).

The battery 189 includes, for example, a battery protection circuit module (PCM) 240. The battery protection circuit 240 may perform various functions (e.g., pre-blocking) to prevent deterioration of or damage to the battery 189. Additionally or alternatively, the battery protection circuit 240 may be configured as at least part of a battery management system (BMS) capable of performing various functions including cell balancing, battery capacity measurement, counting the number of charging or discharging, temperature measurement, or voltage measurement.

According to an embodiment, at least part of the charging state information or usage state information regarding the battery 189 may be measured by using the fuel gauge 230, the power management module 188 or a corresponding sensor (e.g., temperature sensor) of the sensor module 176. In this case, according to an embodiment, the corresponding sensor (e.g., temperature sensor) of the sensor module 176 may be included as part of the battery protection circuit 240 or may be disposed near the battery 189 as a separate device.

Figure 3:
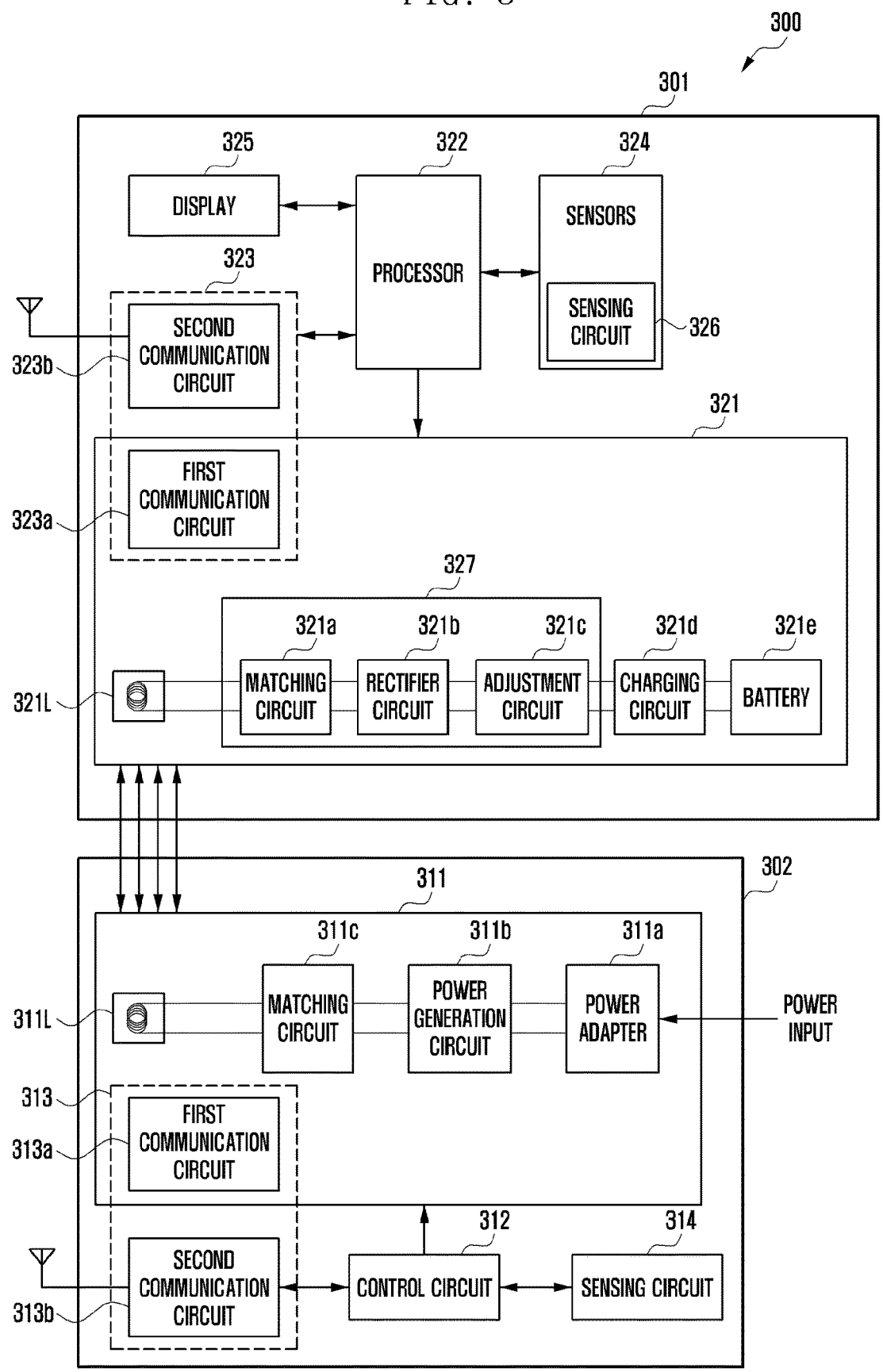
FIG. 3 is a block diagram illustrating a wireless charging system according to an embodiment of the disclosure.

FIG. 3 is a block diagram illustrating a wireless charging system according to an embodiment of the disclosure.

Referring to FIG. 3, a wireless charging system 300 according to various embodiments may include a wireless power transmitting device (hereinafter, referred to as a power transmitting device 302) or a wireless power receiving device (hereinafter, referred to as a power receiving device 301). When the power receiving device 301 is mounted on the transmission coil 311L of the power transmitting device 302, the power transmitting device 302 may wirelessly supply power to the power receiving device 301 through the transmission coil 311L.

In various embodiments of this document, the power transmitting device 302 may be an electronic device identical or similar to the electronic device 101 shown in FIG. 1. The power receiving device 301 may be an external device from the perspective of the power transmitting device 302, and may be an electronic device identical or similar to, for example, the electronic device 102 shown in FIG. 1.

In various embodiments of this document, the power receiving device 301 may be an electronic device identical or similar to the electronic device 101 shown in FIG. 1. The power transmitting device 302 may be an external device from the perspective of the power receiving device 301, and may be an electronic device identical to or similar to, for example, the electronic device 102 shown in FIG. 1.

According to various embodiments, the power transmitting device 302 (e.g., electronic device 101 in FIG. 1) may include a power transfer circuit 311, a control circuit 312 (e.g., processor 120 in FIG. 1), a communication circuit 313 (e.g., communication module 190 in FIG. 1), or a sensing circuit 314 (e.g., sensor module 176 in FIG. 1).

According to various embodiments, the power transfer circuit 311 may include a power adapter 311a that receives input power from the outside and converts the voltage of the input power, a power generation circuit 311b that generates power, or a matching circuit 311c for increasing efficiency between the transmission coil 311L and the reception coil 321L.

According to various embodiments, to enable power transfer to a plurality of power receiving devices (e.g., first power receiving device, and second power receiving device), the power transfer circuit 311 may include plural instances for the power adapter 311a, power generation circuit 311b, transmission coil 311L, or matching circuit 311c.

According to various embodiments, the control circuit 312 may control the overall operation of the power transmitting device 302 and may generate various messages necessary for wireless power transfer and transmit them to the communication circuit 313. In an embodiment, the control circuit 312 may calculate the power (or amount of power) to be transferred to the power receiving device 301 based on the information received from the communication circuit 313. In an embodiment, the control circuit 312 may control the power transfer circuit 311 so that generated power may be transferred through the transmission coil 311L to the power receiving device 301.

According to various embodiments, the communication circuit 313 may include at least one of a first communication circuit 313a or a second communication circuit 313b. The first communication circuit 313a may communicate with a first communication circuit 323a of the power receiving device 301 by using a frequency equal to or close to the frequency used by the transmission coil 311L for power transfer (e.g., in-band scheme).

The first communication circuit 313a may communicate with the first communication circuit 323a of the power receiving device 301 by using the transmission coil 311L. Data (or communication signal) generated by the first communication circuit 313a may be transmitted through the transmission coil 311L. The first communication circuit 313a may transmit data to the power receiving device 301 through frequency shift keying (FSK) modulation. According to various embodiments, the first communication circuit 313a may communicate with the first communication circuit 323a of the power receiving device 301 by varying the frequency of the power signal transmitted through the transmission coil 311L. Alternatively, the first communication circuit 313a may communicate with the first communication circuit 323a of the power receiving device 301 by including data in the power signal generated by the power generation circuit 311b. For example, the first communication circuit 313a may represent data by increasing or decreasing the frequency of the power transfer signal.

The second communication circuit 313b may communicate with a second communication circuit 323b of the power receiving device 301 by using a frequency different from the frequency used by the transmission coil 311L for power transfer (e.g., outband scheme). For example, the second communication circuit 313b may obtain information about the state of charging (e.g., voltage after rectification, rectified voltage (e.g., Vrec), current flowing in the reception coil 321L or rectifier circuit 321b (e.g., load current Tout), various packets, and/or messages) from the second communication circuit 323b by using one of various short range communication schemes such as Bluetooth, Bluetooth low energy (BLE), Wi-Fi, and/or near field communication (NFC).

According to various embodiments, the sensing circuit 314 may include at least one sensor, and may sense one or more states of the power transmitting device 302 by using the at least one sensor.

According to various embodiments, the sensing circuit 314 may include at least one of a temperature sensor, a motion sensor, or a current (or voltage) sensor; the sensing circuit 314 may sense the temperature state of the power transmitting device 302 by using the temperature sensor, may sense the movement state of the power transmitting device 302 by using the motion sensor, and may sense the state of the output signal of the power transmitting device 302 (e.g., current magnitude, voltage magnitude, or power magnitude) by using the current (or voltage) sensor.

According to an embodiment, the current (or voltage) sensor may measure a signal in the power transfer circuit 311. The current (or voltage) sensor may measure a signal at least a portion of the matching circuit 311c or the power generation circuit 311b. For example, the current (or voltage) sensor includes a circuit for measuring a signal at the front end of the transmission coil 311L.

According to various embodiments, the sensing circuit 314 may be a circuit for detecting a foreign substance (e.g., foreign object detection (FOD)).

According to various embodiments, the power receiving device 301 (e.g., electronic device 101 in FIG. 1) may include a power reception circuit 321 (e.g., power management module 188 in FIG. 1), a processor 322 (e.g., processor 120 in FIG. 1), a communication circuit 323 (e.g., communication module 190 in FIG. 1), at least one sensor 324 (e.g., sensor module 176 in FIG. 1), a display 325 (e.g., display module 160 in FIG. 1), or a sensing circuit 326. The power receiving device 301 may be an electronic device identical or similar to the power transmitting device 302, and only components that are varied from the power receiving device 301 will be described in various embodiments of this document.

According to various embodiments, the power reception circuit 321 may include a reception coil 321L that wirelessly receives power from the power transmitting device 302, an Rx IC 327, a charging circuit (e.g., PMIC, charger, switched capacitor, or voltage divider) 321d, or a battery 321e (e.g., the battery 189). In an embodiment, the Rx IC 327 may include a matching circuit 321a connected to the reception coil 321L, a rectifier circuit 321b for rectifying the received AC power into DC power, or an adjustment circuit (e.g., LDO) 321c for adjusting the charging voltage.

According to various embodiments, the processor 322 may control the overall operation of the power receiving device 301, and generate various messages necessary for wireless power reception and forward them to the communication circuit 323.

According to various embodiments, the communication circuit 323 may include at least one of a first communication circuit 323a or a second communication circuit 323b. The first communication circuit 323a may communicate with the power transmitting device 302 through the reception coil 321L.

The first communication circuit 323a may communicate with the first communication circuit 313a through the reception coil 321L. Data (or communication signal) generated by the first communication circuit 323a may be transmitted via the reception coil 321L. The first communication circuit 323a may transmit data to the power transmitting device 302 by using amplitude shift keying (ASK) modulation. The second communication circuit 323b may communicate with the power transmitting device 302 by using one of various short-range communication schemes such as Bluetooth, BLE, Wi-Fi, and NFC.

In various embodiments of this document, packets, information, or data may be transmitted and received between the power transmitting device 302 and the power receiving device 301 by using at least one of the first communication circuit 323a or the second communication circuit 323b.

According to various embodiments, the at least one sensor 324 may include at least some of a current/voltage sensor, a temperature sensor, an illuminance sensor, and an acceleration sensor. In an embodiment, the at least one sensor 324 may be the same as the sensor module 176 in FIG. 1 or may be a separate component.

According to various embodiments, the display 325 may display various information required for wireless power transmission and reception.

According to various embodiments, the sensing circuit 326 may detect the power transmitting device 302 by sensing a discovery signal or power received from the power transmitting device 302. The sensing circuit 326 may detect a signal change at the input or output terminal of the reception coil 321L, the matching circuit 321a, or the rectifier circuit 321b caused by the signal of the reception coil 321L generated by a signal output from the power transmitting device 302. According to various embodiments, the sensing circuit 326 may be included in the power reception circuit 321.

Figure 4:
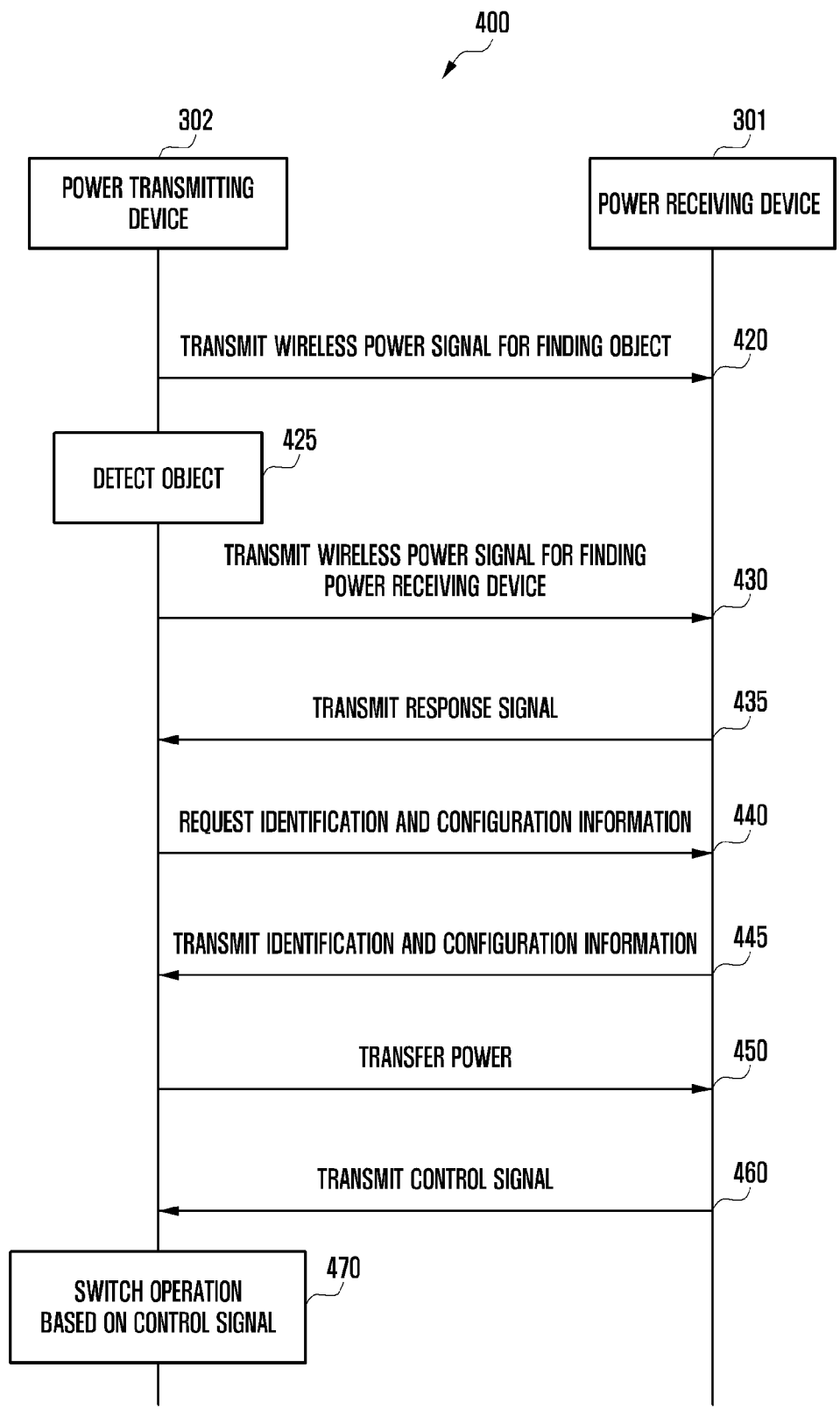
FIG. 4 is a sequence diagram illustrating operations of a wireless charging system according to an embodiment of the disclosure.

FIG. 4 is a sequence diagram illustrating operations of the wireless charging system (e.g., wireless charging system 300 in FIG. 3) according to an embodiment of the disclosure.

Referring to FIG. 4, in the sequence 400, at least some of operations 420 to 470 may be skipped. For example, when one way communication is used in the wireless charging system 300, operation 440 may be skipped.

The operations illustrated in FIG. 4 may be performed by the control circuit (e.g., control circuit 312 in FIG. 3) of the power transmitting device (e.g., power transmitting device 302 in FIG. 3) or may be performed by the processor (e.g., processor 322 in FIG. 3) of the power receiving device (e.g., power receiving device 301 in FIG. 3). For example, the memory (e.g., memory 130 in FIG. 1) of the power transmitting device 302 stores instructions that cause, when executed, the control circuit 312 to execute at least some of the operations illustrated in FIG. 4. For example, the memory (e.g., memory 130 in FIG. 1) of the power receiving device 301 stores instructions that cause, when executed, the processor 322 to execute at least some of the operations illustrated in FIG. 4.

At operation 420, the power transmitting device 302 may determine whether an object (e.g., power receiving device 301, key, coin) is present in the sensing area. The sensing area may be an area in which an object within the area may affect power transfer of the power transmitting device 302. For example, the sensing area is the interface surface of the power transmitting device 302 in the case of inductive coupling, and is the area within a range where power may be transferred in the case of resonance coupling. For example, the power transmitting device 302 detects a change in the amount of power generated from the power transfer circuit (e.g., power transfer circuit 311 in FIG. 3) to determine whether an object is present within a preset range. For instance, the power transmitting device 302 may identify an object by detecting a change in one or more of the frequency, current, or voltage of the power transfer circuit 311. The power transmitting device 302 may distinguish the power receiving device 301 from objects that are not capable of wirelessly receiving power (e.g., key, coin) among the objects within the sensing area in operation 425.

Upon detecting the power receiving device 301, the power transmitting device 302 may perform operation 430. If a given time has elapsed or if the power receiving device 301 is not detected after a given number of searches, the power transmitting device 302 may not perform operation 430 until the object placed on the interface surface is removed.

At operation 430, according to an embodiment, the power transmitting device 302 may transmit a power signal to the power receiving device 301 to search for a power receiving device. For example, the power signal includes power for activating the power receiving device 301 or at least one component of the power receiving device 301. The power signal may be a signal generated, for example, by applying the power signal of a selected operating point for a selected time. The operating point may be defined by the frequency, duty cycle, or amplitude of the voltage applied to the power transfer circuit 311.

At operation 435, the power receiving device 301 may transmit a response signal to the power transmitting device 302 in reply to the search signal at operation 430. For example, the power receiving device 301 transmits the strength of the received power signal or a power transfer termination signal to the power transmitting device 302 in response to the search signal. The strength of a power signal may indicate the degree of coupling or the degree of resonance coupling for power transfer between the power transmitting device 302 and the power receiving device 301. For example, when the power received by the power receiving device 301 is low compared to the power transmitted by the power transmitting device 302, the power receiving device 301 determines that the degree of coupling is low. For example, when there is no response to the power signal transmitted to the outside, the power transmitting device 302 determines that a power receiving device 301 is not found. If the power transmitting device 302 fails to find a power receiving device 301 capable of receiving power, it may perform operation 420 again.

At operation 440, the power transmitting device 302 may transmit a request for at least one of identification information or configuration information related to wireless charging to the power receiving device 301. For example, the identification information includes version information, a manufacturing code, or a basic device identifier. The configuration information may include information regarding, for example, the wireless charging frequency, the maximum chargeable power, the amount of power required for charging, or the amount of average transmission power.

At operation 445, the power receiving device 301 may transmit at least one of the identification information or the configuration information to the power transmitting device 302. The power transmitting device 302 may generate a power transfer contract used for power charging with the power receiving device 301 at least partially based on the received identification information and/or configuration information.

According to an embodiment, the power transfer contract may include limits on the parameters that determine power transfer characteristics in a power transfer state. These limits may include information regarding the version of the power transfer contract, identifier of the power receiving device 301 or the manufacturer, power class, expected maximum power, option settings, time for average received power, or scheme to determine the current of the main cell of the power transmitting device 302.

According to various embodiments, the request for at least one of identification information or configuration information related to wireless charging may be made in different directions, for example, in the opposite direction of the above description. For example, the power transmitting device 302 transmits at least one of identification information of the power transmitting device 302 or configuration information related to wireless charging to the power receiving device 301, and then the power receiving device 301 may transmit a change request for the amount of charging power to the power transmitting device 302. According to various embodiments, the power receiving device 301 may transmit at least one of a request for identification information or configuration information related to wireless charging to the power transmitting device 302, the power receiving device 301 may transmit a control signal (or, control command) for the amount of charging power to the power transmitting device 302 based on the information obtained from the power transmitting device 302, and the power transmitting device 302 may adjust the amount of charging power based on the control signal.

At operation 450, the power transmitting device 302 may transfer power to the power receiving device 301. For example, the power transmitting device 302 transfers power to the power receiving device 301 based on the power transfer contract. For instance, the power transmitting device 302 may monitor the parameters in the power transfer contract, and if power transfer to the power receiving device 301 violates the limits specified in the power transfer contract, the power transmitting device 302 may cancel the power transfer and perform operation 420 again. The power transmitting device 302 may transmit a power signal having a resonant frequency of, for example, about 110 to 190 kHz to the power receiving device 301.

At operation 460, the power receiving device 301 may transmit a control signal to the power transmitting device 302 while receiving power from the power transmitting device 302. For example, when the battery is fully charged, the power receiving device 301 transmits a control signal for requesting termination of wireless power transfer to the power transmitting device 302. The control signal may include at least one of, for example, a transmission power control signal (or, power change signal), a control error signal, a received power signal, a charge status signal, or an end power transfer signal.

According to an embodiment, the control error signal may include a header indicating a control error and a message including a control error value. For example, the power receiving device 301 sets the control error value to zero if the power received at operation 450 from the power transmitting device 302 is within a selected range. The power receiving device 301 may set the control error value to a negative value, for example, if the received power exceeds the selected range. The power receiving device 301 may set the control error value to a positive value, for example, if the received power falls below the selected range. The end power transfer signal may include, for example, a power transfer termination code indicating the reason for termination. For example, the power transfer termination code is specified to indicate one of charge complete, internal fault, over temperature, over voltage, over current, battery failure, reconfiguration, no response, or unknown error.

At operation 470, the power transmitting device 302 may adjust the amount of transmission power applied to the power transfer circuit 311 based on the control signal (e.g., control error value) received from the power receiving device 301.

According to an embodiment, when the received control signal contains information requesting adjustment of the power of the power signal, the power transmitting device 302 may adjust the transmission power by varying the frequency, duty cycle, or amplitude of the voltage applied to the power transfer circuit 311. For example, in response to a first control signal requesting to lower the power of the power signal, the power transmitting device 302 lowers the transmission power by increasing the frequency, lowering the duty cycle, or lowering the amplitude of the voltage applied to the power transfer circuit 311. For example, in response to a second control signal requesting to heighten the power of the power signal, the power transmitting device 302 heightens the transmission power by decreasing the frequency, increasing the duty cycle, or increasing the amplitude of the voltage applied to the power transfer circuit 311.

According to an embodiment, the power transmitting device 302 may terminate power transfer to the power receiving device 301 when the received control signal includes information indicating charging completion. The power transmitting device 302 may perform operation 420 again after terminating power transfer.

An electronic device (e.g., power transmitting device 302 in FIG. 3) that wirelessly transfers power according to various embodiments of the disclosure may include: a power source (e.g., power source circuit 520 in FIG. 5); a transmission coil (e.g., transmission coil 311L in FIG. 3); a full bridge inverter (e.g., a full bridge inverter 510 in FIG. 5) electrically connected to the power source circuit 520 and the transmission coil 311L; and a control circuit (e.g., the control circuit 312 in FIG. 3) configured to communicate with an external device (e.g., the power receiving device 301 in FIG. 3) through the transmission coil 311L and control the full bridge inverter 510 to transmit a power signal through the transmission coil 311L, wherein the full bridge inverter 510 may include a first switch (e.g., a first switch Q1 in FIG. 5) that is electrically connected to one end of the transmission coil 311L and is turned on in response to a first gate signal (e.g., a first gate signal Q1_DRV in FIG. 5) of the control circuit 312, a second switch (e.g., a second switch Q2 in FIG. 5) that is electrically connected to the one end of the transmission coil 311L and is turned on in response to a second gate signal (e.g., a second gate signal Q2_DRV in FIG. 5) of the control circuit 312, a third switch (e.g., a third switch Q3 in FIG. 5) that is electrically connected to the other end of the transmission coil 311L and is turned on in response to a third gate signal (e.g., a third gate signal Q3_DRV in FIG. 5) of the control circuit 312, and a fourth switch (e.g., a fourth switch Q4 in FIG. 5) that is electrically connected to the other end of the transmission coil 311L and is turned on in response to a fourth gate signal (e.g., a fourth gate signal Q4_DRV in FIG. 5) of the control circuit 312, wherein the control circuit 312 may receive a first control signal requesting to lower the power of the power signal to less than a specified power from the external device (i.e., the power receiving device 301), adjust the duty cycle of each of the first to fourth gate signals Q1_DRV, Q2_DRV, Q3_DRV, and Q4_DRV in response to the first control signal, and switch to a PWM driving state in which an operation according to the first period (e.g., first period C1 in FIG. 12) and an operation according to the second period (e.g., second period C2 in FIG. 12) are alternately repeated, wherein, during the first period C1, the control circuit 312 may activate the first gate signal Q1_DRV and the third gate signal Q3_DRV and deactivate the second gate signal Q2_DRV and the fourth gate signal Q4_DRV, where the duty cycle of the third gate signal Q3_DRV may be set to be greater than the duty cycle of the first gate signal Q1_DRV, and wherein, during the second period C2, the control circuit 312 may activate the first gate signal Q1_DRV and the third gate signal Q3_DRV and deactivate the second gate signal Q2_DRV and the fourth gate signal Q4_DRV, where the duty cycle of the first gate signal Q1_DRV may be set to be greater than the duty cycle of the third gate signal Q3_DRV.

According to an embodiment, the control circuit 312 may set the length of a low period in which the second gate signal Q2_DRV is deactivated to be shorter than the length of a low period in which the fourth gate signal Q4_DRV is deactivated, during the first period C1; the control circuit 312 may set the length of a low period in which the second gate signal Q2_DRV is deactivated to be longer than the length of a low period in which the fourth gate signal Q4_DRV is deactivated, during the second period C2.

According to an embodiment, the control circuit 312 may further perform an operation according to the third period (e.g., third period C3 in FIG. 12) and an operation according to the fourth period (e.g., fourth period C4 in FIG. 12) in the PWM driving state, where the third period C3 is a period set between the first period C1 and the second period C2 and the fourth period C4 is, as a period after the second period C2, a period at least partially overlapping the second period C2; the control circuit 312 may repeat in sequence the operations according to the first period C1, third period C3, second period C2, and fourth period C4; the control circuit 312 may activate the second gate signal Q2_DRV and the fourth gate signal Q4_DRV during the third period C3, and may activate the third gate signal Q3_DRV and deactivate the first gate signal Q1_DRV during some of the third period C3; and the control circuit 312 may activate the second gate signal Q2_DRV and the fourth gate signal Q4_DRV during the fourth period C4, and may activate the first gate signal Q1_DRV and deactivate the third gate signal Q3_DRV during some of the fourth period C4.

According to an embodiment, the control circuit 312 may set the duty cycle of the second gate signal Q2_DRV to be greater than the duty cycle of the fourth gate signal Q4_DRV during the third period C3.

According to an embodiment, the control circuit 312 may set the duty cycle of the second gate signal Q2_DRV to be less than the duty cycle of the fourth gate signal Q4_DRV during the fourth period C4.

According to an embodiment, the control circuit 312 may receive a second control signal requesting to change the power of the power signal to be greater than or equal to the specified power from the external device (i.e., the power receiving device 301), and may fix the duty cycle of each of the first to fourth gate signals Q1_DRV, Q2_DRV, Q3_DRV, and Q4_DRV in response to the second control signal and switch to a PFM driving state in which output frequencies of the first to fourth gate signals Q1_DRV, Q2_DRV, Q3_DRV, and Q4_DRV are adjusted.

According to an embodiment, the control circuit 312 may include a demodulation circuit (e.g., demodulation circuit 1010 in FIG. 10) that obtains an error signal by demodulating the first control signal received through the transmission coil 311L from the external device (i.e., the power receiving device 301), a control compensation circuit (e.g., control compensation circuit 1020 in FIG. 10) that generates a control voltage by proportionally and integrally (PI) compensating the error signal, a limiting circuit (e.g., limiting circuit 1030 in FIG. 10) that determines the maximum value of the control voltage and generates a duty control signal, a pulse generator (e.g., pulse generator 1040 in FIG. 10) that generates first to fourth pulses based on the maximum value of the control voltage and the duty control signal, and a dead time circuit (e.g., a dead time circuit 1050 in FIG. 10) that generates the first to fourth gate signals Q1_DRV, Q2_DRV, Q3_DRV, and Q4_DRV by applying a dead time of a specified length to the first to fourth pulses.

According to an embodiment, when the control circuit 312 is switched to the PWM driving state, the pulse generator 1040 may calculate a difference value between the control voltage and the maximum value of the control voltage and apply a dead time having a length proportional to the magnitude of the difference value to the first to fourth pulses.

According to an embodiment, the pulse generator 1040 may apply a first dead time having a length proportional to the magnitude of the difference value to the first pulse and the fourth pulse between the falling edge of the first pulse and the rising edge of the fourth pulse, and may apply a second dead time having a length proportional to the magnitude of the difference value to the third pulse and the second pulse between the falling edge of the third pulse and the rising edge of the second pulse.

According to an embodiment, the pulse generator 1040 may alternately perform an operation of applying the first dead time to the first pulse and the fourth pulse and an operation of applying the second dead time to the second pulse and the third pulse.

An electronic device (e.g., the power transmitting device 302 in FIG. 3) that wirelessly transfers power according to various embodiments of the disclosure may include: a power source (e.g., a power source circuit 520 in FIG. 5); a transmission coil (e.g., the transmission coil 311L in FIG. 3); a full bridge inverter (e.g., full bridge inverter 510 in FIG. 5) electrically connected to the power source circuit 520 and the transmission coil 311L; and a control circuit (e.g., the control circuit 312 in FIG. 3) configured to communicate with an external device (e.g., the power receiving device 301 in FIG. 3) through the transmission coil 311L and control the full bridge inverter 510 to transmit a power signal through the transmission coil 311L, wherein the full bridge inverter 510 may include a first switch (e.g., first switch Q1 in FIG. 5) that is electrically connected to one end of the transmission coil 311L and is turned on in response to a first gate signal (e.g., first gate signal Q1_DRV in FIG. 5) of the control circuit 312, a second switch (e.g., second switch Q2 in FIG. 5) that is electrically connected to the one end of the transmission coil 311L and is turned on in response to a second gate signal (e.g., second gate signal Q2_DRV in FIG. 5) of the control circuit 312, a third switch (e.g., third switch Q3 in FIG. 5) that is electrically connected to the other end of the transmission coil 311L and is turned on in response to a third gate signal (e.g., third gate signal Q3_DRV in FIG. 5) of the control circuit 312, and a fourth switch (e.g., fourth switch Q4 in FIG. 5) that is electrically connected to the other end of the transmission coil 311L and is turned on in response to a fourth gate signal (e.g., fourth gate signal Q4_DRV in FIG. 5) of the control circuit 312, wherein the control circuit 312 may receive a first control signal requesting to lower the power of the power signal to less than a specified power from the external device (i.e., power receiving device 301), adjust the duty cycle of each of the first to fourth gate signals Q1_DRV, Q2_DRV, Q3_DRV, and Q4_DRV in response to the first control signal, and switch to a PWM driving state in which an operation according to the first period (e.g., a first period C1 in FIG. 12) and an operation according to the second period (e.g., a second period C2 in FIG. 12) are alternately repeated, and wherein the control circuit 312 may include a demodulation circuit (e.g., demodulation circuit 1010 in FIG. 10) that obtains an error signal by demodulating the first control signal received through the transmission coil 311L from the external device (i.e., the power receiving device 301), a control compensation circuit (e.g., a control compensation circuit 1020 in FIG. 10) that generates a control voltage by proportionally and integrally (PI) compensating the error signal, a limiting circuit (e.g., a limiting circuit 1030 in FIG. 10) that determines the maximum value of the control voltage and generates a duty control signal, a pulse generator (e.g., a pulse generator 1040 in FIG. 10) that generates first to fourth pulses based on the maximum value of the control voltage and the duty control signal, and a dead time circuit (e.g., a dead time circuit 1050 in FIG. 10) that generates the first to fourth gate signals Q1_DRV, Q2_DRV, Q3_DRV, and Q4_DRV by applying a dead time of a specified length to the first to fourth pulses.

According to an embodiment, when the control circuit 312 is switched to the PWM driving state, the pulse generator 1040 may calculate a difference value between the control voltage and the maximum value of the control voltage and apply a dead time having a length proportional to the magnitude of the difference value to the first to fourth pulses.

According to an embodiment, the pulse generator 1040 may apply a first dead time having a length proportional to the magnitude of the difference value to the first pulse and the fourth pulse between the falling edge of the first pulse and the rising edge of the fourth pulse, and may apply a second dead time having a length proportional to the magnitude of the difference value to the third pulse and the second pulse between the falling edge of the third pulse and the rising edge of the second pulse.

According to an embodiment, the pulse generator 1040 may alternately perform an operation of applying the first dead time to the first pulse and the fourth pulse and an operation of applying the second dead time to the second pulse and the third pulse.

According to an embodiment, during the first period C1, the control circuit 312 may activate the first gate signal Q1_DRV and the third gate signal Q3_DRV and deactivate the second gate signal Q2_DRV and the fourth gate signal Q4_DRV, where the duty cycle of the third gate signal Q3_DRV may be set to be greater than the duty cycle of the first gate signal Q1_DRV; during the second period C2, the control circuit 312 may activate the first gate signal Q1_DRV and the third gate signal Q3_DRV and deactivate the second gate signal Q2_DRV and the fourth gate signal Q4_DRV, where the duty cycle of the first gate signal Q1_DRV may be set to be greater than the duty cycle of the third gate signal Q3_DRV.

According to an embodiment, the control circuit 312 may set the length of a low period in which the second gate signal Q2_DRV is deactivated to be shorter than the length of a low period in which the fourth gate signal Q4_DRV is deactivated, during the first period C1; the control circuit 312 may set the length of a low period in which the second gate signal Q2_DRV is deactivated to be longer than the length of a low period in which the fourth gate signal Q4_DRV is deactivated, during the second period C2.

According to an embodiment, the control circuit 312 may further perform an operation according to the third period (e.g., a third period C3 in FIG. 12) and an operation according to the fourth period (e.g., a fourth period C4 in FIG. 12) in the PWM driving state, where the third period C3 is a period set between the first period C1 and the second period C2 and the fourth period C4 is, as a period after the second period C2, a period at least partially overlapping the second period C2; the control circuit 312 may repeat in sequence the operations according to the first period C1, third period C3, second period C2, and fourth period C4; the control circuit 312 may activate the second gate signal Q2_DRV and the fourth gate signal Q4_DRV during the third period C3, and may activate the third gate signal Q3_DRV and deactivate the first gate signal Q1_DRV during some of the third period C3; and the control circuit 312 may activate the second gate signal Q2_DRV and the fourth gate signal Q4_DRV during the fourth period C4, and may activate the first gate signal Q1_DRV and deactivate the third gate signal Q3_DRV during some of the fourth period C4.

According to an embodiment, the control circuit 312 may set the duty cycle of the second gate signal Q2_DRV to be greater than the duty cycle of the fourth gate signal Q4_DRV during the third period C3.

According to an embodiment, the control circuit 312 may set the duty cycle of the second gate signal Q2_DRV to be less than the duty cycle of the fourth gate signal Q4_DRV during the fourth period C4.

According to an embodiment, the control circuit 312 may receive a second control signal requesting to change the power of the power signal to be greater than or equal to the specified power from the external device (i.e., the power receiving device 301), and may fix the duty cycle of each of the first to fourth gate signals Q1_DRV, Q2_DRV, Q3_DRV, and Q4_DRV in response to the second control signal and switch to a PFM driving state in which output frequencies of the first to fourth gate signals Q1_DRV, Q2_DRV, Q3_DRV, and Q4_DRV are adjusted.

Figure 5:
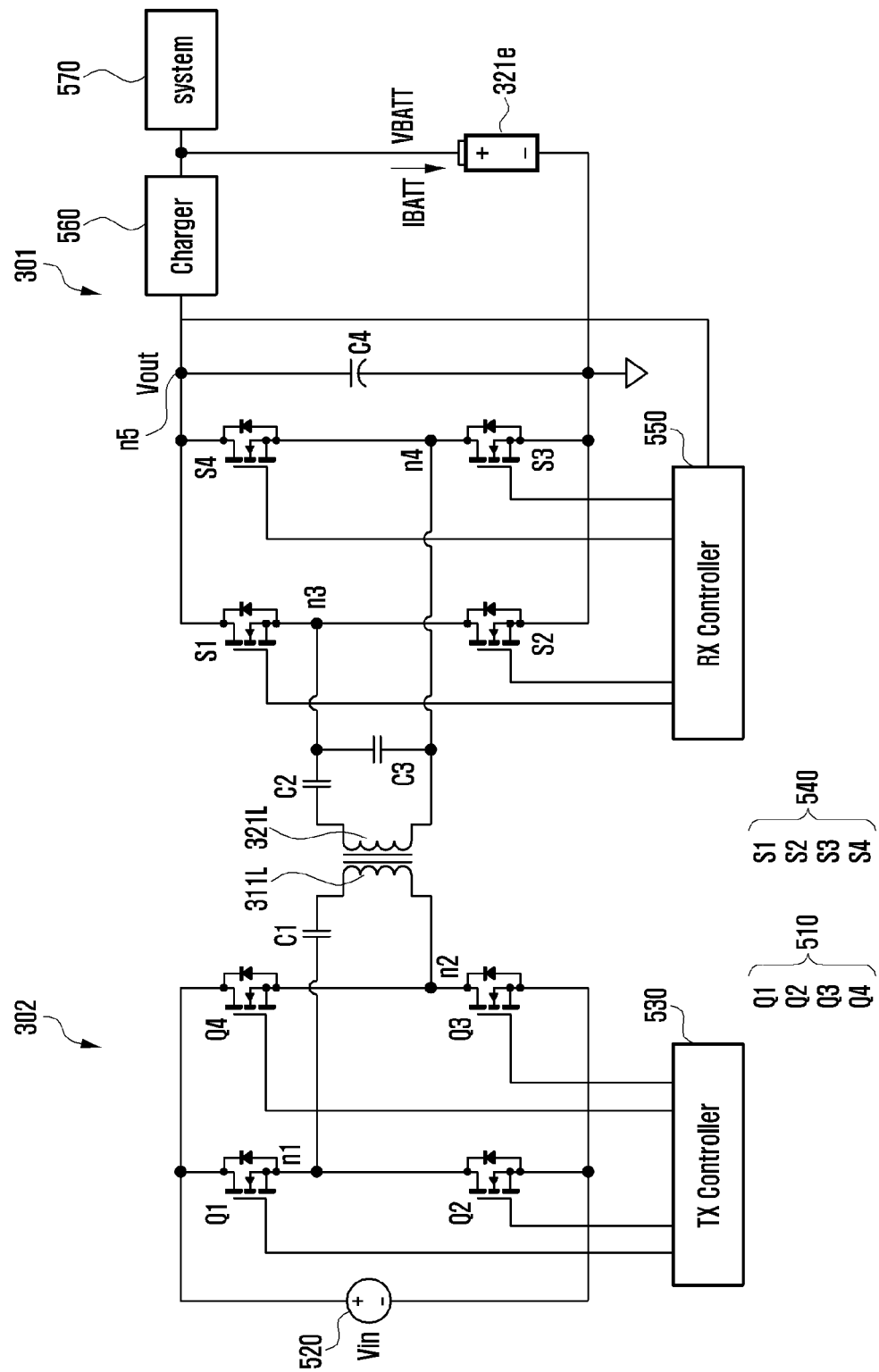
FIG. 5 is a circuit diagram of a wireless charging system according to an embodiment of the disclosure.

FIG. 5 is a circuit diagram of a wireless charging system according to an embodiment of the disclosure.

The wireless charging system shown in FIG. 5 may include an embodiment at least partially similar to or different from the wireless charging system 300 described in FIG. 3. Next, only parts that have not been described in FIG. 3 or are changed therefrom will be described with reference to FIG. 5.

Referring to FIG. 5, the wireless charging system 300 according to various embodiments may include a power transmitting device 302 and a power receiving device 301.

The power transmitting device 302 may include a power source circuit 520, a full bridge inverter 510, a transmission coil 311L, and a Tx control circuit 530 (e.g., the control circuit 312 in FIG. 3).

According to an embodiment, the power source circuit 520 (e.g., the power adapter 311*a* in FIG. 3) may supply a power signal having a specified voltage (e.g., about 10V to 14V) to the transmission coil 311L through the full bridge inverter 510 by using power input from an external device (e.g., travel adapter) or power supplied from a battery (not shown) included in the power transmitting device 302.

According to an embodiment, the full bridge inverter 510 may include first to fourth switches Q1, Q2, Q3, and Q4 for supplying the power signal supplied from the power source circuit 520 to the transmission coil 311L through switching. The full bridge inverter 510 may be turned on or off in response to first to fourth gate signals Q1_DRV, Q2_DRV, Q3_DRV, and Q4_DRV output from the Tx control circuit 530, thereby adjusting the frequency or duty cycle of the power signal.

In the illustrated example, the first to fourth switches Q1, Q2, Q3, and Q4 may be defined as n-type metal oxide silicon field effect transistors (MOSFETs), but the first to fourth switches Q1, Q2, Q3, and Q4 may also be p-type MOSFETs.

The first switch Q1 and the second switch Q2 of the full bridge inverter 510 may be electrically connected to one end n1 of the transmission coil 311L.

The first switch Q1 may include a gate for receiving the first gate signal Q1_DRV output from the Tx control circuit 530, a drain connected to the first electrode (e.g., positive electrode) of the power source circuit 520, and a source connected to the one end n1 of the transmission coil 311L. According to an embodiment, the first switch Q1 may be turned on in response to the first gate signal Q1_DRV output from the Tx control circuit 530 to thereby electrically connect the first electrode (e.g., positive electrode) of the power source circuit 520 and the one end n1 of the transmission coil 311L.

The second switch Q2 may be connected in series with the first switch Q1. The second switch Q2 may include a gate for receiving the second gate signal Q2_DRV output from the Tx control circuit 530, a drain connected to the one end n1 of the transmission coil 311L, and a source connected to the second electrode (e.g., negative electrode) of the power source circuit 520. According to an embodiment, the second switch Q2 may be turned on in response to the second gate signal Q2_DRV output from the Tx control circuit 530 to thereby electrically connect the second electrode (e.g., negative electrode) of the power source circuit 520 and the one end n1 of the transmission coil 311L.

The third switch Q3 and the fourth switch Q4 of the full bridge inverter 510 may be electrically connected to the other end n2 of the transmission coil 311L.

The third switch Q3 may include a gate for receiving the third gate signal Q3_DRV output from the Tx control circuit 530, a drain connected to the other end n2 of the transmission coil 311L, and a source connected to the second electrode (e.g., negative electrode) of the power source circuit 520. According to an embodiment, the third switch Q3 may be turned on in response to the third gate signal Q3_DRV output from the Tx control circuit 530 to thereby electrically connect the second electrode (e.g., negative electrode) of the power source circuit 520 and the other end n2 of the transmission coil 311L.

The fourth switch Q4 may be connected in series with the third switch Q3. The fourth switch Q4 may include a gate for receiving the fourth gate signal Q4_DRV output from the Tx control circuit 530, a drain connected to the first electrode (e.g., positive electrode) of the power source circuit 520, and a source connected to the other end n2 of the transmission coil 311L. According to an embodiment, the fourth switch Q4 may be turned on in response to the fourth gate signal Q4_DRV output from the Tx control circuit 530 to thereby electrically connect the first electrode (e.g., positive electrode) of the power source circuit 520 and the other end n2 of the transmission coil 311L.

The power transmitting device 302 may further include a first capacitor C1 connected in series with the one end n1 of the transmission coil 311L. The first capacitor C1 may form a resonance network for wireless power transfer together with the transmission coil 311L.

Although not shown, the Tx control circuit 530 may communicate with the power receiving device 301 by detecting a change in amplitude of the power signal through one end n1 of the transmission coil 311L or the other end n2 of the transmission coil 311L (e.g., inband scheme). For example, the power receiving device 301 may transmit data to the power transmitting device 302 by using amplitude shift keying (ASK) modulation, and the data received by the power transmitting device 302 from the power receiving device 301 may include at least one piece of data defined in wireless charging standards (e.g., wireless power consortium (WPC)), such as control signal, identification information, and/or configuration information.

The power receiving device 301 may include a reception coil 321L for receiving power wirelessly, a Rx control circuit 550 (e.g., the Rx IC 327 in FIG. 3), a rectifier circuit 540 electrically connected to the reception coil 321L, and a charger 560 (e.g., the charging circuit in FIG. 3) that supplies a specified voltage to the system 570 and the battery 321e of the power receiving device 301 by using the voltage rectified by the rectifier circuit 540. The power receiving device 301 may further include a second capacitor C2 connected in series with one end n3 of the reception coil 321L. The second capacitor C2 may form a resonant network for wireless power reception together with the reception coil 321L. According to an embodiment, the power receiving device 301 may further include a third capacitor C3 disposed between one end n3 and the other end n4 of the reception coil 321L, and a fourth capacitor C4 disposed between the output terminal n5 of the rectifier circuit 540 and the ground.

Although not shown, the power receiving device 301 may further include an adjustment circuit (e.g., LDO) (e.g., the adjustment circuit 321c in FIG. 3) that adjusts the voltage rectified by the rectifier circuit 540. According to an embodiment, the adjustment circuit may be included in the charger 560.

According to an embodiment, the rectifier circuit 540 may include fifth to eighth switches S1, S2, S3 and S4 for rectifying the power signal received through the reception coil 321L, and the fifth to eighth switches S1, S2, S3 and S4 may be connected in the form of a full bridge.

The fifth switch S1 and the sixth switch S2 of the rectifier circuit 540 may be electrically connected to one end n3 of the reception coil 321L, and the seventh switch S3 and the eighth switch S4 of the rectifier circuit 540 may be electrically connected to the other end n4 of the reception coil 321L.

In the illustrated example, the fifth to eighth switches S1, S2, S3 and S4 are defined as n-type metal oxide silicon field effect transistors (MOSFETs), but the fifth to eighth switches S1, S2, S3 and S4 may also be p-type MOSFETs.

The fifth to eighth switches S1, S2, S3 and S4 of the rectifier circuit 540 may rectify the power signal received through the reception coil 321L by using body diode characteristics of the MOSFET.

The power signal rectified by the rectifier circuit 540 may be supplied to the charger 560 through the adjustment circuit (e.g., LDO). The power signal rectified by the rectifier circuit 540 may be defined as "rectified voltage (Vout or Vrect)".

According to an embodiment, the charger 560 may use the rectified voltage to charge the battery 321e or to supply a voltage required for the system 570 (e.g., at least one component of the power receiving device 301) of the power receiving device 301.

According to an embodiment, the charger 560 may perform constant current (CC) charging and constant voltage (CV) charging to charge the battery 321e. CC charging may be defined as a charging method in which the battery 321e is charged using a constant current until the voltage of the battery 321e reaches a specified voltage (e.g., full charge voltage). CV charging may be defined as a charging method in which the battery 321e is charged using a constant voltage, and when the voltage of the battery 321e reaches a specified voltage, the supply current (e.g., load current) is lowered until the battery 321e is fully charged.

Figure 6:
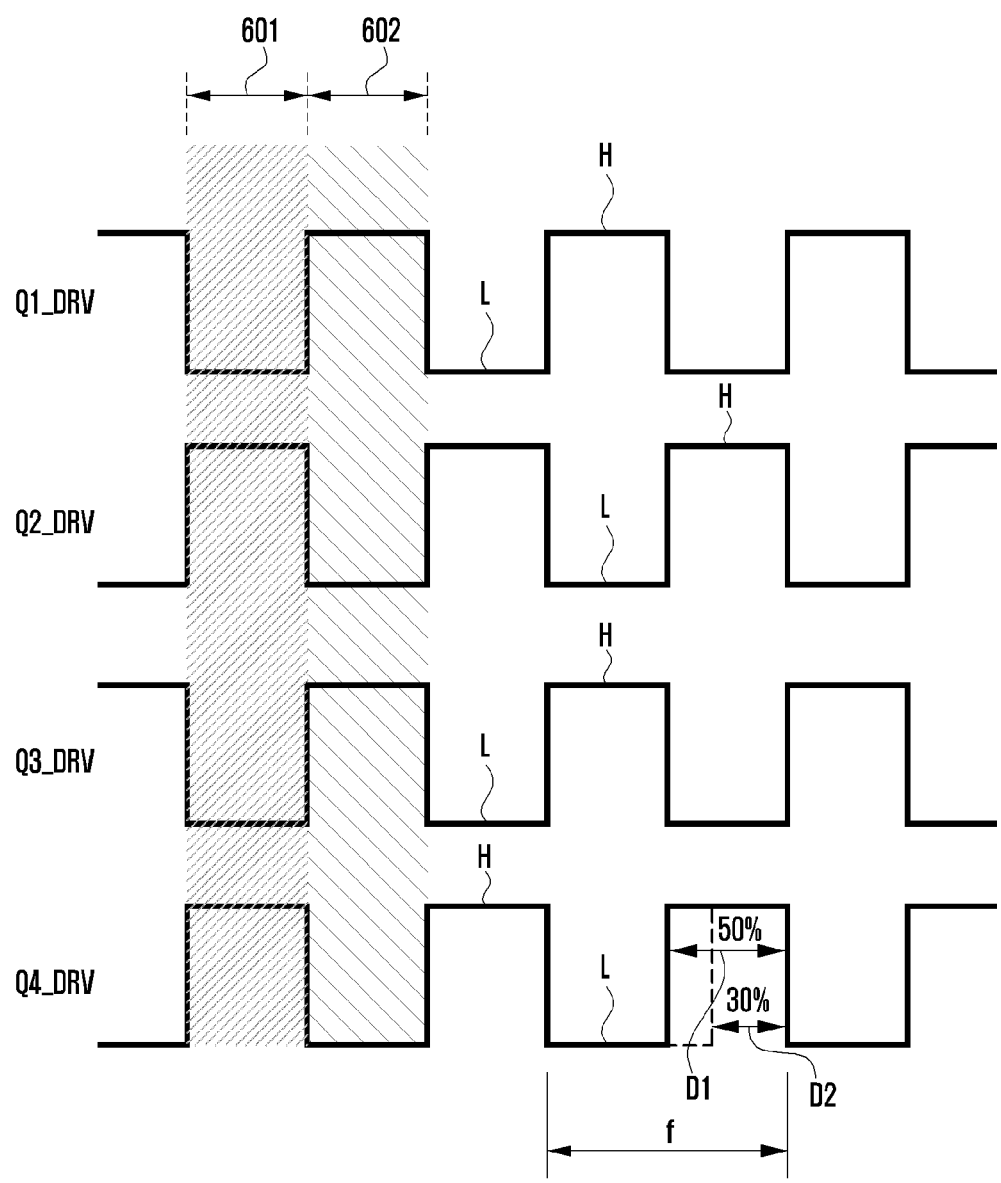
FIG. 6 illustrates gate signals for controlling a full bridge inverter of a power transmitting device according to an embodiment of the disclosure.

FIG. 6 illustrates gate signals for controlling a full bridge inverter of a power transmitting device according to an embodiment of the disclosure.

In the illustrated example, Q1_DRV may be defined as a first gate signal Q1_DRV for controlling the first switch Q1 of the full bridge inverter 510.

In the illustrated example, Q2_DRV may be defined as a second gate signal Q2_DRV for controlling the second switch Q2 of the full bridge inverter 510.

In the illustrated example, Q3_DRV may be defined as a third gate signal Q3_DRV for controlling the third switch Q3 of the full bridge inverter 510.

In the illustrated example, Q4_DRV may be defined as a fourth gate signal Q4_DRV for controlling the fourth switch Q4 of the full bridge inverter 510.

In the illustrated example, the high state H of each of the first to fourth gate signals Q1_DRV, Q2_DRV, Q3_DRV, and Q4_DRV may be defined as a voltage state capable of turning on each of the first to fourth switches Q1, Q2, Q3, and Q4 implemented with MOSFETs.

In the illustrated example, the low state L of each of the first to fourth gate signals Q1_DRV, Q2_DRV, Q3_DRV, and Q4_DRV may be defined as a voltage state capable of turning off each of the first to fourth switches Q1, Q2, Q3, and Q4 implemented with MOSFETs.

In various embodiments of this document, the expression "a gate signal is output" may be defined as that the gate signal is in high state H. For example, the expression "the first gate signal Q1_DRV is output" means that the first gate signal Q1_DRV is in high state H.

In various embodiments of this document, the expression "a gate signal is not output" may be defined as that the gate signal is in low state L. For example, the expression "the first gate signal Q1_DRV is not output" means that the first gate signal Q1_DRV is in low state L.

Although not shown, a dead time having a specified length (e.g., duty cycle of about 1% to 3%) can be set immediately before the rising edge (e.g., time point at which the signal transitions from low state L to high state H) of each of the first to fourth gate signals Q1_DRV, Q2_DRV, Q3_DRV, and Q4_DRV. For example, each of the first to fourth gate signals Q1_DRV, Q2_DRV, Q3_DRV, and Q4_DRV includes a low state (L) period of a specified length (e.g., duty cycle of about 1% to 3%) during the dead time. According to an embodiment, the dead time may be a period for enabling zero voltage switching (ZVS) when the first to fourth switches Q1, Q2, Q3, and Q4 are turned on. The power transmitting device 302 according to an embodiment enables zero voltage switching when the first to fourth switches Q1, Q2, Q3, and Q4 are turned on, thereby reducing power loss due to switching noise.

Referring to FIGS. 5 and 6, the Tx control circuit 530 of the power transmitting device 302 may supply the power signal supplied from the power source circuit 520 to the transmission coil 311L by alternately turning on the first switch Q1 and the third switch Q3, and the second switch Q2 and the fourth switch Q4 constituting the full bridge inverter 510.

According to an embodiment, operations by which the Tx control circuit 530 controls the full bridge inverter 510 may be divided into first operation 601 and second operation 602, and the Tx control circuit 530 may alternately perform first operation 601 and second operation 602 based on a designated frequency. For example, the Tx control circuit 530 may perform second operation 602 after performing first operation 601, and may perform first operation 601 after performing second operation 602.

As first operation 601, the Tx control circuit 530 may output the second gate signal Q2_DRV and the fourth gate signal Q4_DRV, and may not output the first gate signal Q1_DRV and the third gate signal Q3_DRV. For example, while the Tx control circuit 530 performs first operation 601, the second switch Q2 and the fourth switch Q4 may be turned on, and the first switch Q1 and the third switch Q3 may be turned off. In the power transmitting device 302, while the Tx control circuit 530 performs first operation 601, the power signal supplied from the power source circuit 520 may be supplied to the transmission coil 311L through the second switch Q2 and the fourth switch Q4.

As second operation 602, the Tx control circuit 530 may output the first gate signal Q1_DRV and the third gate signal Q3_DRV, and may not output the second gate signal Q2_DRV and the fourth gate signal Q4_DRV. For example, while the Tx control circuit 530 performs second operation 602, the first switch Q1 and the third switch Q3 may be turned on, and the second switch Q2 and the fourth switch Q4 may be turned off. In the power transmitting device 302, while the Tx control circuit 530 performs second operation 602, the power signal supplied from the power source circuit 520 may be supplied to the transmission coil 311L through the first switch Q1 and the third switch Q3.

According to an embodiment, the Tx control circuit 530 may adjust the transmission power (e.g., power of a power signal) transferred through the transmission coil 311L to the power receiving device 301 by adjusting the frequency f at which the first to fourth gate signals Q1_DRV, Q2_DRV, Q3_DRV, and Q4_DRV are output. For example, the Tx control circuit 530 may increase the transmission power by lowering the frequency f at which the first to fourth gate signals Q1_DRV, Q2_DRV, Q3_DRV, and Q4_DRV are output. The Tx control circuit 530 may lower the transmission power by increasing the frequency f at which the first to fourth gate signals Q1_DRV, Q2_DRV, Q3_DRV, and Q4_DRV are output. In various embodiments of this document, the state in which the Tx control circuit 530 of the power transmitting device 302 adjusts the transmission power by adjusting the frequency f at which the first to fourth gate signals Q1_DRV, Q2_DRV, Q3_DRV, and Q4_DRV are output may be defined as "pulse frequency modulation mode (PFM mode)" of the power transmitting device 302.

According to an embodiment, the Tx control circuit 530 may adjust the transmission power (e.g., power of a power signal) transferred through the transmission coil 311L to the power receiving device 301 by adjusting the duty cycle D1 and D2 of the gate signal while the first to fourth gate signals Q1_DRV, Q2_DRV, Q3_DRV, and Q4_DRV are output. For example, the Tx control circuit 530 may increase the transmission power by increasing the duty cycle D1 and D2 at which the first to fourth gate signals Q1_DRV, Q2_DRV, Q3_DRV, and Q4_DRV are output. The duty cycle refers to, for controlling the first to fourth switches Q1, Q2, Q3, and Q4, the ratio of a duration when the first to fourth gate signals Q1_DRV, Q2_DRV, Q3_DRV, and Q4_DRV are output to the sum of a duration when the first to fourth gate signals Q1_DRV, Q2_DRV, Q3_DRV, and Q4_DRV are output and a duration when the first to fourth gate signals Q1_DRV, Q2_DRV, Q3_DRV, and Q4_DRV are not output, in one period of repeating first operation 601 and second operation 602.

According to an embodiment, the Tx control circuit 530 may reduce the transmission power by lowering the duty cycle D1 and D2 at which the first to fourth gate signals Q1_DRV, Q2_DRV, Q3_DRV, and Q4_DRV are output. For example, the transmission power when the gate signal is output at a duty cycle D1 of 50% may be higher than the transmission power when the gate signal is output at a duty cycle D2 of 30%. In various embodiments of this document, the state in which the Tx control circuit 530 of the power transmitting device 302 adjusts the transmission power by adjusting the duty cycle D1 and D2 at which the first to fourth gate signals Q1_DRV, Q2_DRV, Q3_DRV, and Q4_DRV are output may be defined as "pulse width modulation mode (PWM mode)" of the power transmitting device 302.

According to an embodiment, the Tx control circuit 530 may operate in PFM mode or in PWM mode based on a control signal received from the power receiving device 301. For example, the Tx control circuit 530 identifies the load current (e.g., current supplied to the charger 560 in FIG. 5) of the power receiving device 301 based on a control signal received from the power receiving device 301, and may operate in PFM mode or in PWM mode to set the transmission power corresponding to the load current.

According to an embodiment, the Tx control circuit 530 may receive a first control signal requesting to lower the power of the power signal to less than a specified power from the power receiving device 301, and may operate in PWM mode in response to the first control signal.

According to an embodiment, the Tx control circuit 530 may receive a second control signal requesting to increase the power of the power signal to be greater than or equal to a specified power from the power receiving device 301, and may switch from PWM mode to PFM mode in response to the second control signal.

According to an embodiment, the Tx control circuit 530 may control power while operating in PFM mode if the frequency is within a specified range, and may control power by switching to PWM mode if a frequency change for controlling power is out of the specified range.

Figure 7:
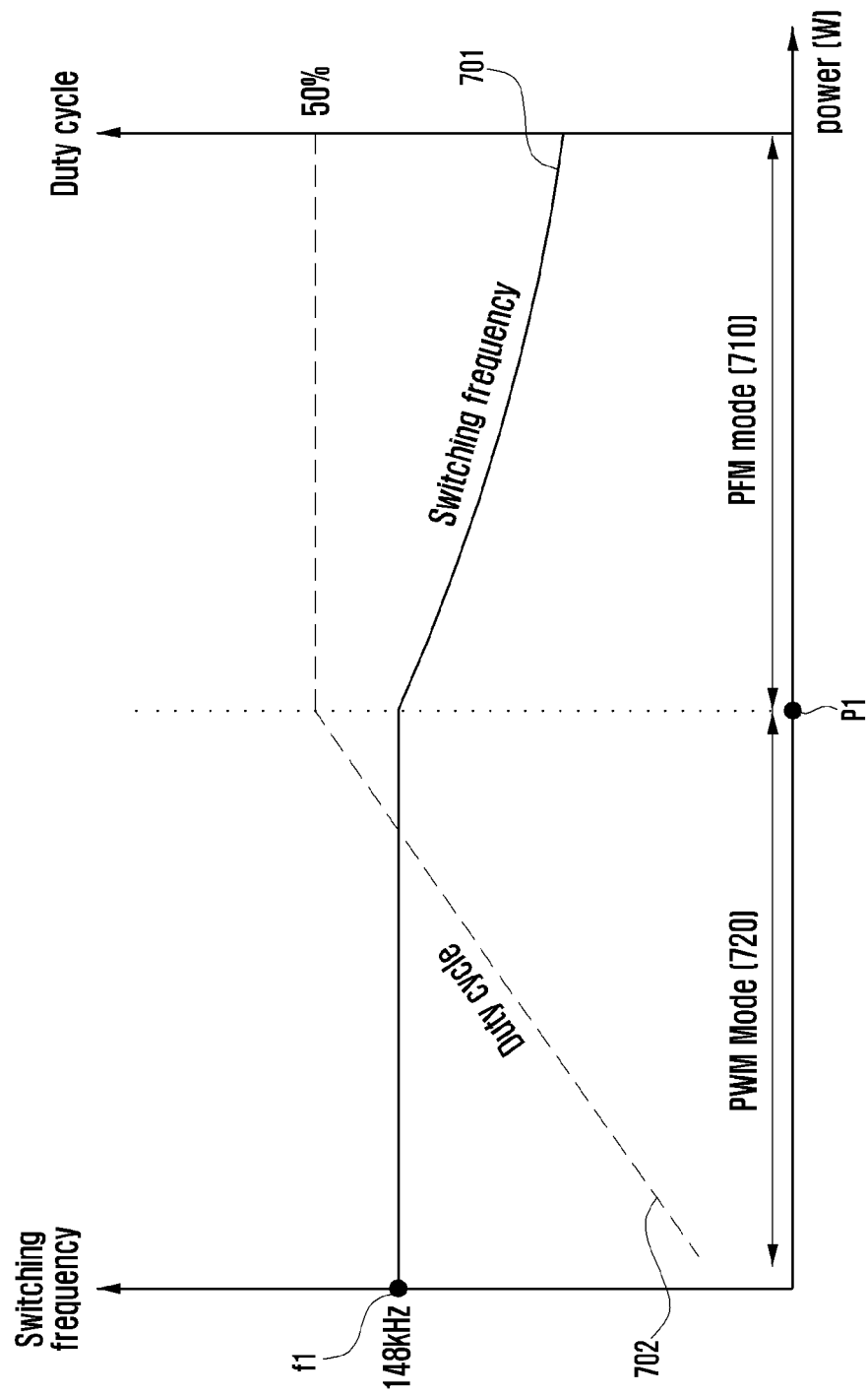
FIG. 7 is a graph showing a magnitude of transmission power in a pulse frequency modulation (PFM) mode and a PWM mode according to an embodiment of the disclosure.

FIG. 7 is a graph showing the magnitude of transmission power (e.g., power of a power signal) in PFM mode and PWM mode according to an embodiment of the disclosure. A graph 701 in FIG. 7 indicates the output frequency of the gate signal output from the Tx control circuit 530. A graph 702 in FIG. 7 indicates the duty cycle of the gate signal output from the Tx control circuit 530.

Referring to FIG. 7, the Tx control circuit (e.g., the Tx control circuit 530 in FIG. 5) may identify the load current of the power receiving device 301 based on a control signal received from the power receiving device (e.g., the power receiving device 301 in FIG. 5), and may operate in PFM mode or in PWM mode to set a transmission power corresponding to the load current.

The Tx control circuit 530 may increase the transmission power by lowering the frequency (e.g., the frequency f in FIG. 6) at which the first to fourth gate signals Q1_DRV, Q2_DRV, Q3_DRV, and Q4_DRV are output. The Tx control circuit 530 may lower the transmission power by increasing the frequency f at which the first to fourth gate signals Q1_DRV, Q2_DRV, Q3_DRV, and Q4_DRV are output.

The Tx control circuit 530 may set a limit frequency f1 when increasing the frequency f at which the first to fourth gate signals Q1_DRV, Q2_DRV, Q3_DRV, and Q4_DRV are output. The limit frequency f1 may be, for example, a threshold value defined in a wireless charging standard (e.g., wireless power consortium (WPC)) in consideration of electromagnetic interference (EMI). For example, the maximum value of the frequency f at which the first to fourth gate signals Q1_DRV, Q2_DRV, Q3_DRV, and Q4_DRV are output may be set to about 150 kHz.

According to the illustrated example, the limit frequency f1 is set to 148 kHz, and the Tx control circuit 530 is not allowed to increase the frequency f at which the first to fourth gate signals Q1_DRV, Q2_DRV, Q3_DRV, and Q4_DRV are output to 148 kHz or higher.

When receiving a control signal requesting to lower the transmission power to less than the specified voltage P1 corresponding to the limit frequency f1 from the power receiving device 301, the Tx control circuit 530 may switch from PFM mode to PWM mode.

After switching to PWM mode, the Tx control circuit 530 may maintain the frequency f at which the first to fourth gate signals Q1_DRV, Q2_DRV, Q3_DRV, and Q4_DRV are output at the limit frequency f1, and may adjust the duty cycle at which the first to fourth gate signals Q1_DRV, Q2_DRV, Q3_DRV, and Q4_DRV are output.

According to an embodiment, the Tx control circuit 530 may adjust the transmission power (e.g., power of a power signal) transferred through the transmission coil 311L to the power receiving device 301 by adjusting the duty cycle of the gate signal while the first to fourth gate signals Q1_DRV, Q2_DRV, Q3_DRV, and Q4_DRV are being output. For example, the Tx control circuit 530 may increase the transmission power by increasing the duty cycle at which the first to fourth gate signals Q1_DRV, Q2_DRV, Q3_DRV, and Q4_DRV are output. The Tx control circuit 530 may lower the transmission power by lowering the duty cycle at which the first to fourth gate signals Q1_DRV, Q2_DRV, Q3_DRV, and Q4_DRV are output. For example, the transmission power when the gate signal is output at a duty cycle of 50% is higher than the transmission power when the gate signal is output at a duty cycle of 30%.

The Tx control circuit 530 may set a threshold value in lowering the duty cycle of the gate signal. For example, the threshold for the duty cycle is set to about 30%, and the Tx control circuit 530 is not allowed to lower the duty cycle of the gate signal below the threshold of about 30%. The threshold value of the duty cycle may be a threshold value set to enable zero voltage switching (ZVS) when the first to fourth switches Q1, Q2, Q3, and Q4 are turned on. For example, if the duty cycle of the gate signal is lowered below the threshold value (e.g., less than about 30%), it becomes difficult to maintain appropriate communication quality when the power receiving device 301 transmits data to the power transmitting device 302 by using amplitude shift keying (ASK) modulation, and zero voltage switching may be not achieved and power loss due to switching noise may increase when the first to fourth switches Q1, Q2, Q3, and Q4 are turned on.

Figure 8:
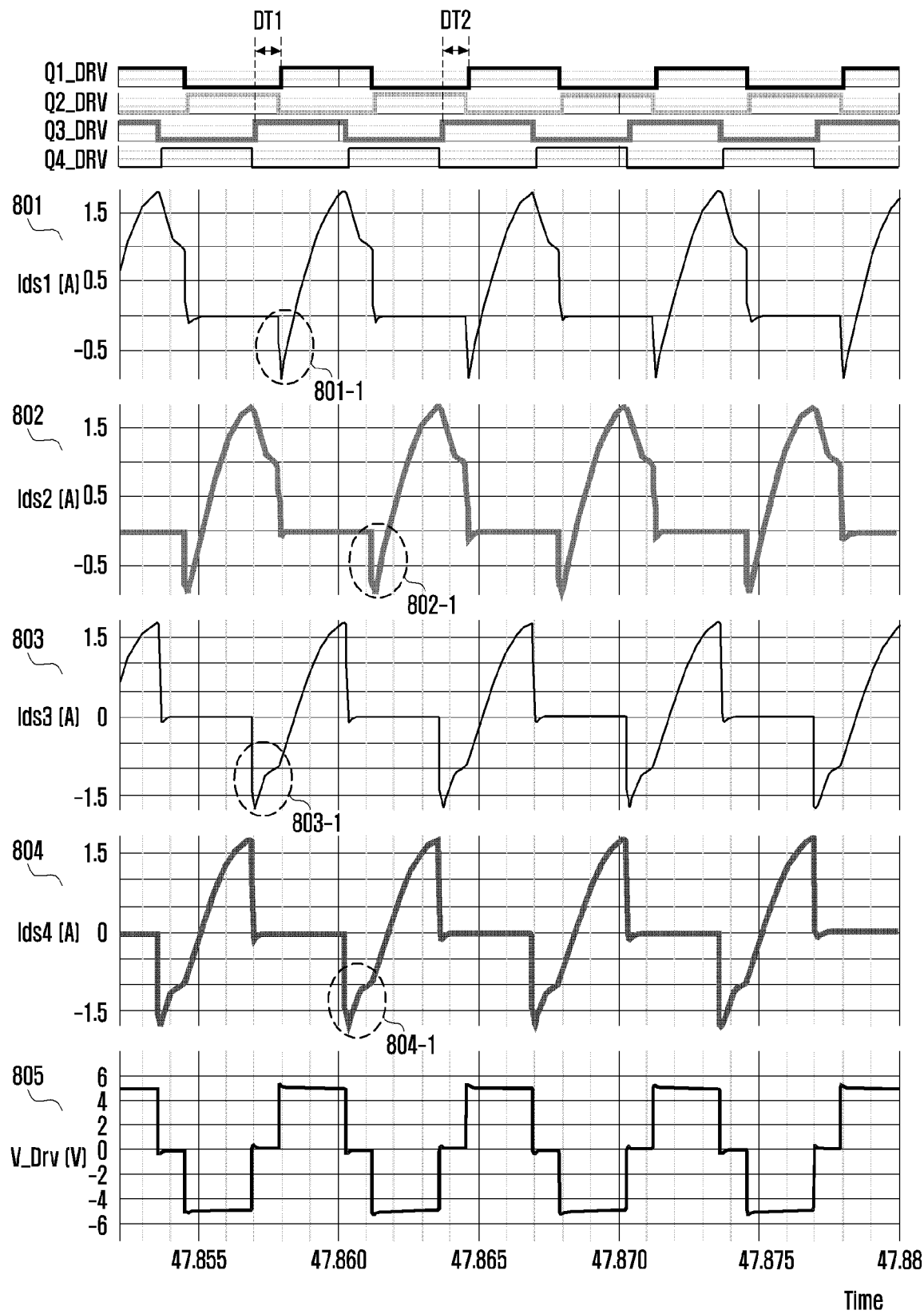
FIG. 8 may be graphs illustrating a phase shifted PWM scheme in which at least some of periods in which first to fourth gate signals are output overlap according to an embodiment of the disclosure.
Figure 9:
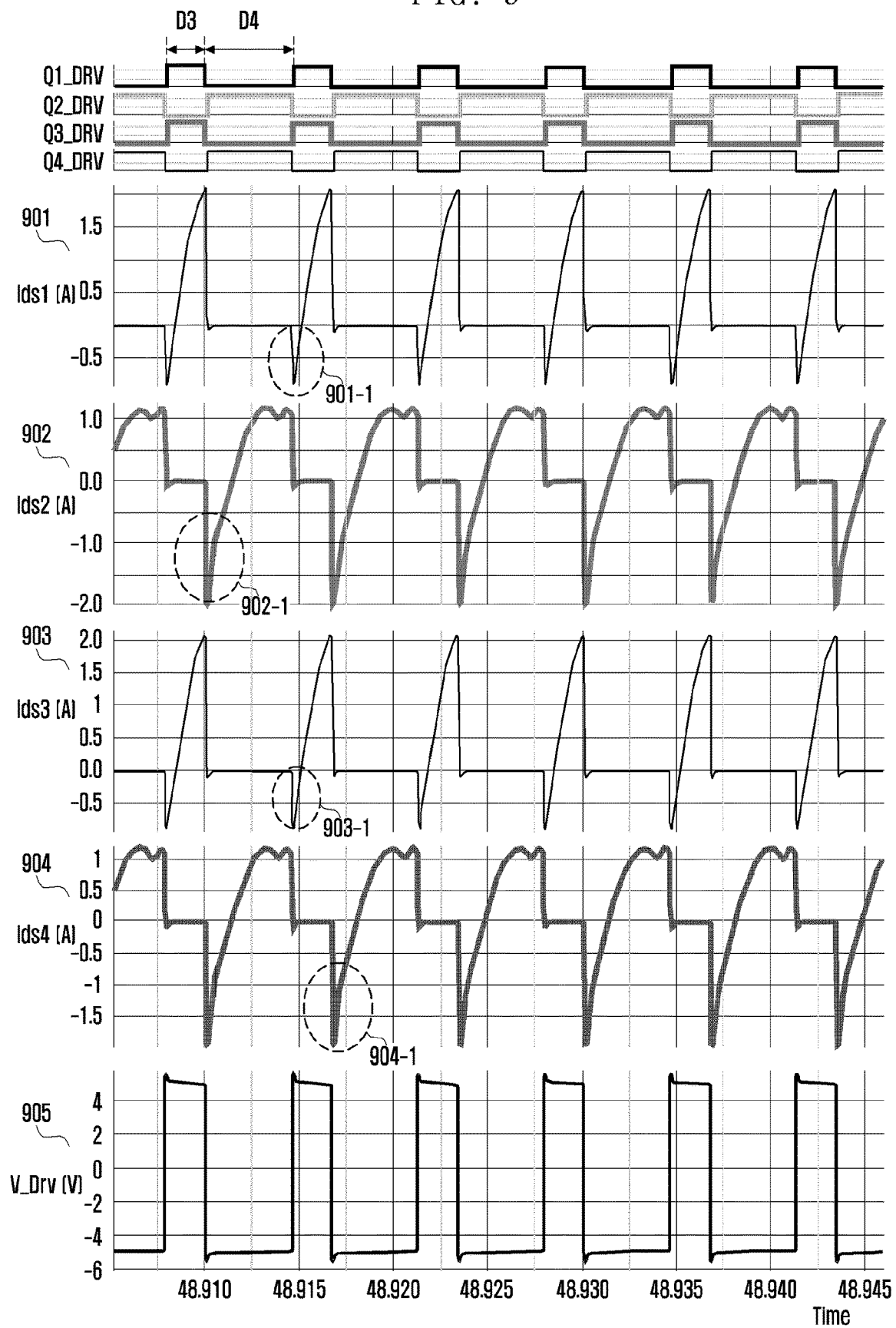
FIG. 9 may be graphs illustrating an asymmetric PWM scheme that asymmetrically controls periods during which first to fourth gate signals are output according to an embodiment of the disclosure.

As a method for facilitating zero voltage switching when the first to fourth switches Q1, Q2, Q3, and Q4 are turned on while the power transmitting device 302 operates in PWM mode, there may be PWM driving methods according to comparative examples shown in FIGS. 8 and 9.

FIG. 8 may be graphs illustrating a phase shifted PWM scheme in which at least some of the periods in which the first to fourth gate signals are output overlap according to an embodiment of the disclosure.

Referring to FIG. 8, a graph 801 in FIG. 8 indicates the current Ids1 of the first switch Q1 according to the first gate signal Q1_DRV. A graph 802 in FIG. 8 indicates the current Ids2 of the second switch Q2 according to the second gate signal Q2_DRV. A graph 803 in FIG. 8 indicates the current Ids3 of the third switch Q3 according to the third gate signal Q3_DRV. A graph 804 in FIG. 8 indicates the current Ids4 of the fourth switch Q4 according to the fourth gate signal Q4_DRV. A graph 805 in FIG. 8 indicates the driving voltage V_Dry applied across the transmission coil 311L.

According to the phase shifted PWM scheme shown in FIG. 8, the phase of the first gate signal Q1_DRV and the phase of the second gate signal Q2_DRV may be inverted from each other, and the phase of the third gate signal Q3_DRV and the phase of the fourth gate signal Q4_DRV may be inverted from each other.

According to the phase shifted PWM scheme shown in FIG. 8, the phase of the first gate signal Q1_DRV may be shifted by a specified phase compared to the phase of the third gate signal Q3_DRV. For example, the first gate signal Q1_DRV transitions from a low state to a high state after a specified first delay time DT1 from the time point when the third gate signal Q3_DRV transitions from a low state to a high state.

According to the phase shifted PWM scheme shown in FIG. 8, the phase of the second gate signal Q2_DRV may be shifted by a specified phase compared to the phase of the fourth gate signal Q4_DRV. For example, the second gate signal Q2_DRV transitions from a low state to a high state after a specified second delay time DT2 from the time point when the fourth gate signal Q4_DRV transitions from a low state to a high state.

In the phase shifted PWM scheme described above, the phase difference between first gate signal Q1_DRV and third gate signal Q3_DRV and the phase difference between second gate signal Q2_DRV and fourth gate signal Q4_DRV may make it easy to secure a dead time period for zero voltage switching when the first to fourth switches Q1, Q2, Q3, and Q4 are turned on, so that switching noise can be reduced. Next, a description will be given of zero voltage switching of the first to fourth switches Q1, Q2, Q3, and Q4 based on the phase shifted PWM scheme.

A portion indicated by 801-1 of the graph 801 indicates that a reverse current flows temporarily through the body diode before the first switch Q1 is turned on and a forward current flows, which means that the first switch Q1 has zero voltage switching when turned on.

A portion indicated by 802-1 of the graph 802 indicates that a reverse current flows temporarily through the body diode before the second switch Q2 is turned on and a forward current flows, which means that the second switch Q2 has zero voltage switching when turned on.

A portion indicated by 803-1 of the graph 803 indicates that a reverse current flows temporarily through the body diode before the third switch Q3 is turned on and a forward current flows, which means that the third switch Q3 has zero voltage switching when turned on.

A portion indicated by 804-1 of the graph 804 indicates that a reverse current flows temporarily through the body diode before the fourth switch Q4 is turned on and a forward current flows, which means that the fourth switch Q4 has zero voltage switching when turned on.

FIG. 9 may be graphs illustrating an asymmetric PWM scheme that asymmetrically controls the periods during which the first to fourth gate signals Q1_DRV, Q2_DRV, Q3_DRV, and Q4_DRV are output according to an embodiment of the disclosure.

Referring to FIG. 9, a graph 901 in FIG. 9 indicates the current Ids1 of the first switch Q1 according to the first gate signal Q1_DRV. A graph 902 in FIG. 9 indicates the current Ids2 of the second switch Q2 according to the second gate signal Q2_DRV. A graph 903 in FIG. 9 indicates the current Ids3 of the third switch Q3 according to the third gate signal Q3_DRV. A graph 904 in FIG. 9 indicates the current Ids4 of the fourth switch Q4 according to the fourth gate signal Q4_DRV. A graph 905 in FIG. 9 indicates the driving voltage V_Drv applied across the transmission coil 311L.

According to the asymmetric PWM scheme shown in FIG. 9, the phase of the first gate signal Q1_DRV and the phase of the third gate signal Q3_DRV may be the same, and the phase of the second gate signal Q2_DRV and the phase of the fourth gate signal Q4_DRV may be the same. The phase of the first gate signal Q1_DRV and the third gate signal Q3_DRV and the phase of the second gate signal Q2_DRV and the fourth gate signal Q4_DRV may be inverted from each other. The duty cycle D3 of the first gate signal Q1_DRV and the third gate signal Q3_DRV may be smaller than the duty cycle D4 of the second gate signal Q2_DRV and the fourth gate signal Q4_DRV.

In the asymmetric PWM scheme described above, causing the duty cycle D3 of the first gate signal Q1_DRV and the third gate signal Q3_DRV to be smaller than the duty cycle D4 of the second gate signal Q2_DRV and the fourth gate signal Q4_DRV may make it easy to secure a dead time period for zero voltage switching when the first to fourth switches Q1, Q2, Q3, and Q4 are turned on. Next, a description will be given of zero voltage switching of the first to fourth switches Q1, Q2, Q3, and Q4 based on the asymmetric PWM scheme.

A portion indicated by 901-1 of the graph 901 indicates that a reverse current flows temporarily through the body diode before the first switch Q1 is turned on and a forward current flows, which means that the first switch Q1 has zero voltage switching when turned on.

A portion indicated by 902-1 of the graph 902 indicates that a reverse current flows temporarily through the body diode before the second switch Q2 is turned on and a forward current flows, which means that the second switch Q2 has zero voltage switching when turned on.

A portion indicated by 903-1 of the graph 903 indicates that a reverse current flows temporarily through the body diode before the third switch Q3 is turned on and a forward current flows, which means that the third switch Q3 has zero voltage switching when turned on.

A portion indicated by 904-1 of the graph 904 indicates that a reverse current flows temporarily through the body diode before the fourth switch Q4 is turned on and a forward current flows, which means that the fourth switch Q4 has zero voltage switching when turned on.

Although the PWM driving schemes according to the comparative examples illustrated in FIGS. 8 and 9 have an advantage of easy zero voltage switching when the first to fourth switches Q1, Q2, Q3, and Q4 are turned on, due to the asymmetry of the current in the first to fourth switches Q1, Q2, Q3, and Q4, heat generation may relatively increase at a specific switch. When heat generation is relatively increased in the specific switch, reliability may deteriorate in the long term. For example, it is seen that the shapes of the graphs 801 and 802 in FIG. 8 are different from the shapes of the graphs 803 and 804 in FIG. 8, which may indicate that the first to fourth switches Q1, Q2, Q3, and Q4 are asymmetric in the amount of current when they are turned on. For example, it can be seen that the shapes of the graphs 901 and 902 in FIG. 9 are different from the shapes of the graphs 903 and 904 in FIG. 9, which may indicate that the first to fourth switches Q1, Q2, Q3, and Q4 are asymmetric in the amount of current when they are turned on.

Next, a description will be given of a new scheme that facilitates zero voltage switching when the first to fourth switches Q1, Q2, Q3, and Q4 are turned on while the power transmitting device 302 according to various embodiments of the disclosure operates in PWM mode and can solve those problems mentioned in the comparative examples of FIGS. 8 and 9. For example, the PWM driving method according to an embodiment described below may make the root-mean-square (RMS) current values of the four switches Q1, Q2, Q3, and Q4 uniform to thereby prevent a decrease in reliability that may occur due to a relative increase in heat generation at a specific switch, which can ensure stable operation of the power supply.

Figure 10:
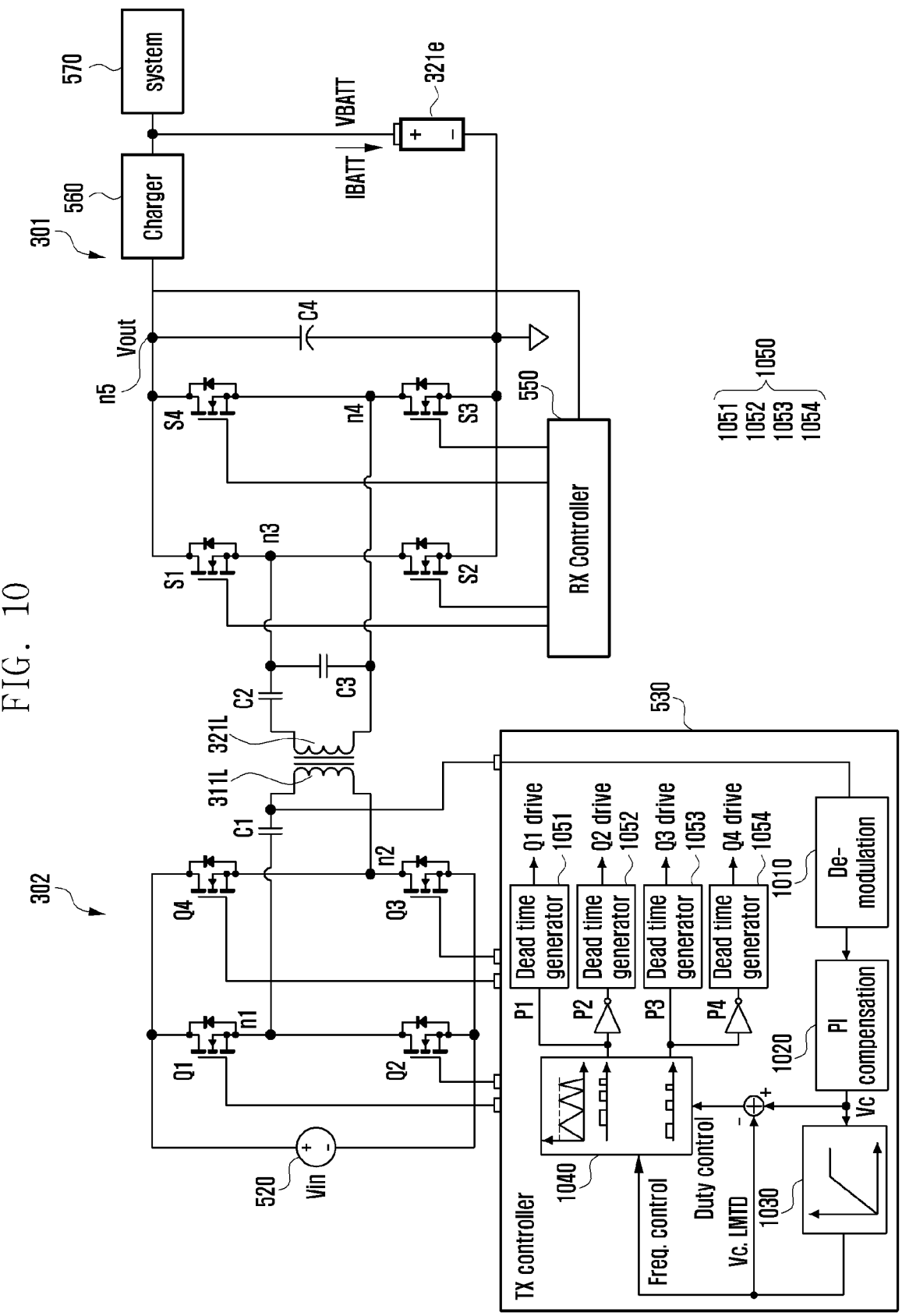
FIG. 10 is a circuit diagram of the wireless charging system according to an embodiment of the disclosure.

FIG. 10 is a circuit diagram of the wireless charging system 300 according to an embodiment of the disclosure.

The wireless charging system 300 shown in FIG. 10 may include an embodiment at least partially similar to or different from the wireless charging system 300 described in FIGS. 3 and 5. Hereinafter, with reference to FIG. 10, only parts not described in or changed from FIGS. 3 and 5 will be described.

Referring to FIG. 10, the Tx control circuit 530 (e.g., Tx control circuit 530 in FIG. 5) may include a demodulation circuit 1010, a control compensation circuit 1020, a limiting circuit 1030, a pulse generator 1040, and a dead time circuit 1050.

According to an embodiment, the demodulation circuit 1010 may obtain an error signal by demodulating a control signal received through the transmission coil 311L from the power receiving device (e.g., power receiving device 301 in FIG. 5). The error signal may include information about a target voltage set by the power receiving device 301 based on the load current (e.g., current supplied to the charger 560).

According to an embodiment, the control compensation circuit 1020 may generate a control voltage Vc by performing proportional and integral (PI) compensation on the obtained error signal. The control compensation circuit 1020 may include a proportional and integral controller for performing feedback control on the power or voltage (e.g., rectified voltage Vrect) received from the power receiving device 301. The control compensation circuit 1020 may determine the control voltage Vc to reach the target voltage set by the power receiving device 301 from the error signal.

Figure 11:
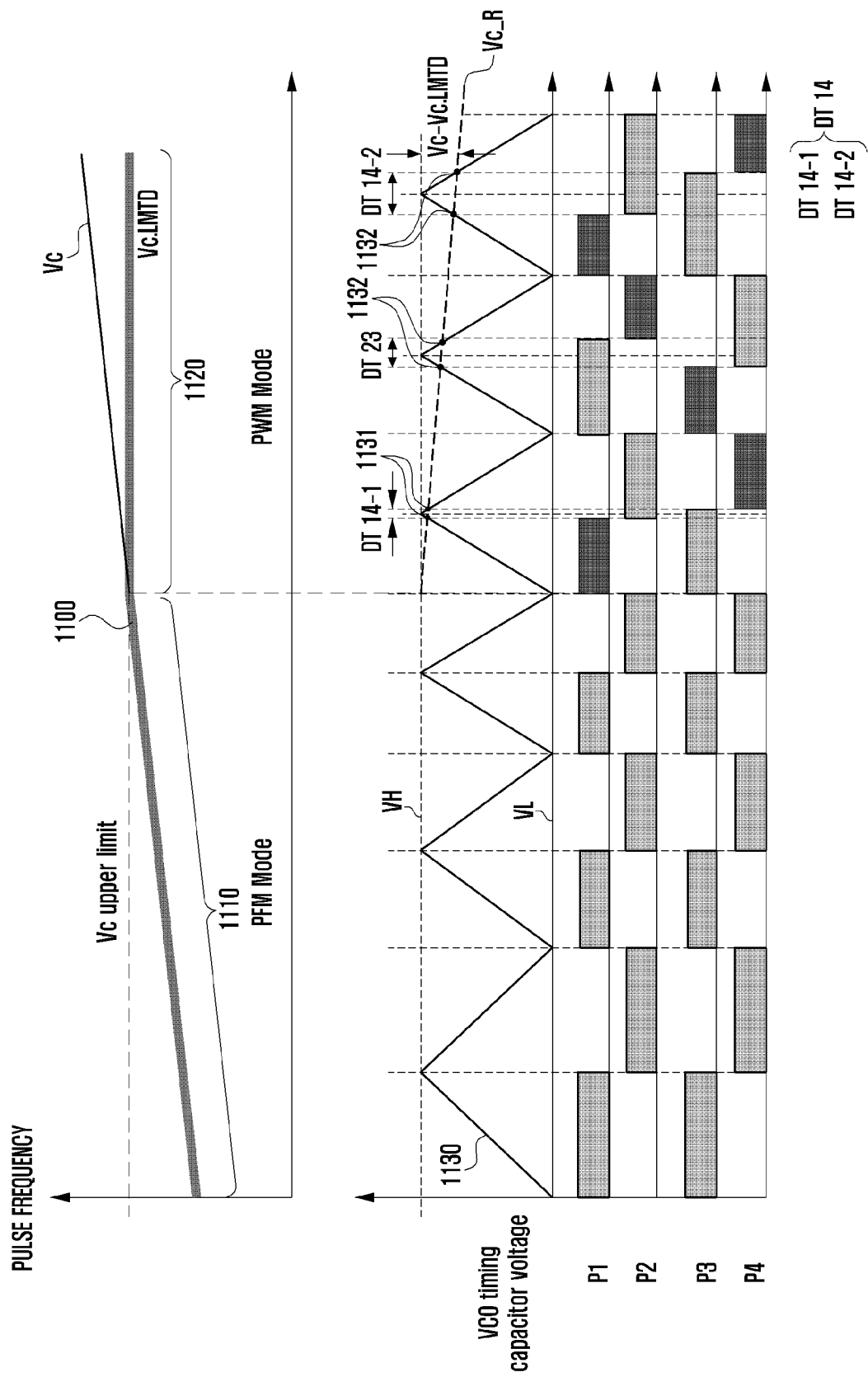
FIG. 11 is an operational waveform diagram of a limiting circuit and a pulse generator according to an embodiment of the disclosure.

According to an embodiment, the limiting circuit 1030 may be a circuit that determines the frequency value of the pulse corresponding to the control voltage Vc and limits the maximum value of the frequency (e.g., upper limit value (Vc upper limit) in FIG. 11). For example, the maximum value of the pulse frequency corresponding to the control voltage Vc may be a value corresponding to the maximum frequency set in PFM mode (e.g., the limit frequency f1 in FIG. 7, 148 kHz). When the control voltage Vc exceeds a preset maximum value, the limiting circuit 1030 may fix the pulse frequency value to the maximum frequency and generate a duty control signal. The duty control signal may be a parameter that determines the duty cycle of the first to fourth gate signals Q1_DRV, Q2_DRV, Q3_DRV, and Q4_DRV when the power transmitting device 302 is switched to PWM mode.

According to an embodiment, the pulse generator 1040 may generate the first to fourth pulses P1, P2, P3, P4 based on the frequency and duty control signal determined by the limiting circuit 1030. For example, the pulse generator 1040 generates a triangular wave output at a specified frequency (e.g., triangular wave 1130 in FIG. 11) according to the duty control signal, and may adjust the duty cycle and phase of the first to fourth pulses P1, P2, P3, P4 by using the triangular wave.

According to an embodiment, the dead time circuit 1050 may apply a dead time of a specified length to the first to fourth pulses P1, P2, P3, P4 generated by the pulse generator 1040 to generate the first to fourth gate signals Q1_DRV, Q2_DRV, Q3_DRV, and Q4_DRV. For example, the dead time circuit 1050 may add a dead time having a specified length (e.g., duty cycle of about 1% to 3%) immediately before the rising edge (e.g., time point when the signal transitions from low state L to high state H) of each of the first to fourth pulses P1, P2, P3, P4. According to various embodiments, the length of the dead time added to each of the first to fourth pulses P1, P2, P3, P4 by the dead time circuit 1050 may be adaptively varied within a specified range (e.g., duty cycle of about 1% to 3%). For example, the dead time circuit 1050 may vary the length of the dead time according to the type of the PWM scheme in which the power transmitting device 302 operates (e.g., phase shifted PWM or asymmetric PWM) and/or the period during which each of the first to fourth switches (e.g., first to fourth switches Q1, Q2, Q3, and Q4 in FIG. 5) constituting the full bridge inverter is turned on, which can improve electromagnetic interference (EMI) and efficiency by maintaining zero voltage switching (ZVS) in a wider load range.

According to an embodiment, when the power transmitting device 302 operates in the phase shifted PWM scheme shown in FIG. 8 and the duty cycle is set to about 50% or a value close to about 50%, the dead time circuit 1050 may set the dead time for each of the first to fourth gate signals Q1_DRV, Q2_DRV, Q3_DRV, and Q4_DRV to a short period. For example, the dead time circuit 1050 may set the dead time for each of the first to fourth gate signals Q1_DRV, Q2_DRV, Q3_DRV, and Q4_DRV to a minimum threshold value.

According to an embodiment, when the power transmitting device 302 operates in the phase shifted PWM scheme shown in FIG. 8 and the duty cycle of the first to fourth gate signals Q1_DRV, Q2_DRV, Q3_DRV, and Q4_DRV is reduced from about 50%, the dead time circuit 1050 may set different dead times for the first to fourth gate signals Q1_DRV, Q2_DRV, Q3_DRV, and Q4_DRV. For example, in response to decreasing the duty cycle, the dead time circuit 1050 may set the dead time of each of the first and second gate signals Q1_DRV and Q2_DRV controlling the first and second switches Q1 and Q2, which are lagging legs, to increase from the minimum threshold value. For example, in response to decreasing the duty cycle, the dead time circuit 1050 may set the dead time of each of the third and fourth gate signals Q3_DRV and Q4_DRV controlling the third and fourth switches Q3 and Q4, which are leading legs, to be maintained at the minimum threshold value. According to an embodiment, the dead time circuit 1050 may set the dead time of each of the first and second gate signals Q1_DRV and Q2_DRV controlling the first and second switches Q1 and Q2, which are lagging legs, to increase, where when the dead time reaches the maximum threshold value, the dead time circuit 1050 may set the dead time to be maintained at the maximum threshold value without further increasing the dead time.

According to an embodiment, when the power transmitting device 302 operates in the asymmetric PWM scheme shown in FIG. 9 and the duty cycle is set to about 50% or a value close to about 50%, the dead time circuit 1050 may set the dead time of each of the first to fourth gate signals Q1_DRV, Q2_DRV, Q3_DRV, and Q4_DRV to a short period. For example, the dead time circuit 1050 sets the dead time for each of the first to fourth gate signals Q1_DRV, Q2_DRV, Q3_DRV, and Q4_DRV to a minimum threshold value.

According to an embodiment, when the power transmitting device 302 operates in the asymmetric PWM scheme shown in FIG. 9 and the duty cycle of the first to fourth gate signals Q1_DRV, Q2_DRV, Q3_DRV, and Q4_DRV is reduced from about 50%, the dead time circuit 1050 may set different dead times for the first to fourth gate signals Q1_DRV, Q2_DRV, Q3_DRV, and Q4_DRV. For example, in response to decreasing the duty cycle, the dead time circuit 1050 sets the dead time for each of the first and third gate signals Q1_DRV and Q3_DRV controlling the first and third switches Q1 and Q3, which are lagging legs, to increase from the minimum threshold value. For example, in response to decreasing the duty cycle, the dead time circuit 1050 sets the dead time for each of the second and fourth gate signals Q2_DRV and Q4_DRV controlling the second and fourth switches Q3 and Q4, which are leading legs, to be maintained at the minimum threshold value. According to an embodiment, the dead time circuit 1050 may set the dead time for each of the first and third gate signals Q1_DRV and Q3_DRV controlling the first and third switches Q1 and Q3, which are lagging legs, to increase, where when the dead time reaches the maximum threshold value, the dead time circuit 1050 may set the dead time to be maintained at the maximum threshold value without further increasing the dead time. According to an embodiment, the dead time circuit 1050 may include a first dead time circuit 1051 to generate the first gate signal Q1_DRV by adding a dead time having a specified length (e.g., duty cycle of about 1% to 3%) to the first pulse P1, a second dead time circuit 1052 to generate the second gate signal Q2_DRV by adding a dead time having a specified length (e.g., duty cycle of about 1% to 3%) to the second pulse P2, a third dead time circuit 1053 to generate the third gate signal Q3_DRV by adding a dead time having a specified length (e.g., duty cycle of about 1% to 3%) to the third pulse P3, and a fourth dead time circuit 1054 to generate the fourth gate signal Q4_DRV by adding a dead time having a specified length (e.g., duty cycle of about 1% to 3%) to the fourth pulse P4. According to an embodiment, the dead time may be a period for enabling zero voltage switching when the first to fourth switches Q1, Q2, Q3, and Q4 are turned on.

FIG. 11 is an operational waveform diagram of the limiting circuit 1030 and the pulse generator 1040 according to an embodiment of the disclosure. For example, FIG. 11 is an operational waveform diagram of the limiting circuit 1030 and the pulse generator 1040 shown in FIG. 10.

Referring to FIG. 11, the limiting circuit 1030 may determine the pulse frequency value corresponding to the control voltage Vc and limit the maximum value of the frequency (Vc upper limit).

Referring to FIG. 11, a graph 1100 may indicate the pulse frequency value determined according to the control voltage Vc.

As indicated by a first portion 1110 of a graph 1100, when the control voltage Vc is less than a specified value (e.g., maximum value (Vc upper limit)), the limiting circuit 1030 may transmit a frequency value that is proportional to the control voltage Vc and smaller than the maximum value (Vc upper limit) to the pulse generator 1040.

As indicated by a second portion 1120 of a graph 1100, when the control voltage Vc is greater than or equal to the specified value (e.g., maximum value), the limiting circuit 1030 may transmit a frequency Vc.LMTD corresponding to the maximum value (Vc upper limit) to the pulse generator 1040.

According to an embodiment, the pulse generator 1040 may operate in PFM mode when the control voltage Vc is less than a specified value.

According to an embodiment, the pulse generator 1040 may generate a triangular wave 1130 while operating in PFM mode, and may set the frequency of the triangular wave 1130 to a value proportional to the magnitude of the control voltage Vc. For example, the frequency of the triangular wave 1130 generated by the pulse generator 1040 proportionally increases until the control voltage Vc reaches a specified value (e.g., limit value).

According to an embodiment, when the control voltage Vc is greater than or equal to a specified value (e.g., limit value), the pulse generator 1040 may fix the frequency of the triangular wave 1130 to a specified frequency (e.g., maximum frequency).

According to an embodiment, while operating in PFM mode, the pulse generator 1040 may generate the first to fourth pulses P1, P2, P3, P4 by using the triangular wave 1130. For example, in a section where the voltage of the triangular wave 1130 rises from a designated low voltage VL to a designated high voltage VH, the pulse generator 1040 outputs the first pulse P1 and the third pulse P3 in a high state, and output the second pulse P2 and the fourth pulse P4 in a low state. In a section where the voltage of the triangular wave 1130 falls from a designated high voltage VH to a designated low voltage VL, the pulse generator 1040 may output the second pulse P2 and the fourth pulse P4 in a high state, and output the first pulse P1 and the third pulse P3 in a low state. According to an embodiment, while operating in PFM mode, the duty cycle for the first pulse P1, the second pulse P2, the third pulse P3, and the fourth pulse P4 may be 50%.

According to an embodiment, the pulse generator 1040 may operate in PWM mode when the control voltage Vc is greater than or equal to a specified value Vc.LMTD.

According to an embodiment, while operating in PWM mode, the pulse generator 1040 may calculate a difference value (Vc-Vc.LMTD) between the control voltage Vc and the specified value Vc.LMTD. The pulse generator 1040 may apply a first dead time DT14 having a length proportional to the magnitude of the difference value (Vc-Vc.LMTD) to the first pulse P1 and the fourth pulse P4, and may apply a second dead time DT23 having a length proportional to the magnitude of the difference value (Vc-Vc.LMTD) to the second pulse P2 and the third pulse P3. For example, if the difference value (Vc-Vc.LMTD) has a relatively small first magnitude, as indicated by DT14-1, the pulse generator 1040 adds a relatively short first dead time DT14 to the first pulse P1 and the fourth pulse P4. For example, if the difference value (Vc-Vc.LMTD) has a relatively large second magnitude, as indicated by DT14-2, the pulse generator 1040 adds a relatively long second dead time DT14 to the first pulse P1 and the fourth pulse P4.

According to an embodiment, in case of applying the first dead time DT14 to the first pulse P1 and the fourth pulse P4, the pulse generator 1040 may apply the first dead time DT14 to each of the first pulse P1 and the fourth pulse P4 between the falling edge (e.g., transition from high state H to low state L) of the first pulse P1 and the rising edge (e.g., transition from low state L to high state H) of the fourth pulse P4. In an embodiment, in case of applying the first dead time DT14 to the first pulse P1 and the fourth pulse P4, the second pulse P2 may be inverted to the first pulse P1, and the third pulse P3 may be inverted to the fourth pulse P4.

According to an embodiment, in case of applying the second dead time DT23 to the second pulse P2 and the third pulse P3, the pulse generator 1040 may apply the second dead time DT23 to each of the third pulse P3 and the second pulse P2 between the falling edge (e.g., transition from high state H to low state L) of the third pulse P3 and the rising edge (e.g., transition from low state L to high state H) of the second pulse P2. In an embodiment, in case of applying the second dead time DT23 to the second pulse P2 and the third pulse P3, the first pulse P1 may be inverted to the second pulse P2, and the fourth pulse P4 may be inverted to the third pulse P3.

According to an embodiment, the pulse generator 1040 may alternately perform an operation of applying the first dead time DT14 to the first and fourth pulses P1 and P4, and an operation of applying the second dead time DT23 to the second and third pulses P2 and P3.

In the illustrated example, Vc_R in FIG. 11 may indicate an inverted graph in which the phase of a graph corresponding to the control voltage Vc generated by the control compensation circuit 1020 is inverted. Points indicated by 1131, 1132 and 1133 on the inverted graph Vc_R may represent a timing at which the triangular wave 1130 and the inverted graph Vc_R cross. While operating in PWM mode, the pulse generator 1040 may apply the first dead time to the first pulse P1 and the fourth pulse P4 or apply the second dead time to the second pulse P2 and the third pulse P3 at a timing 1131, 1132 or 1133 at which the inverted graph Vc_R and the triangular wave 1130 cross.

Figure 12:
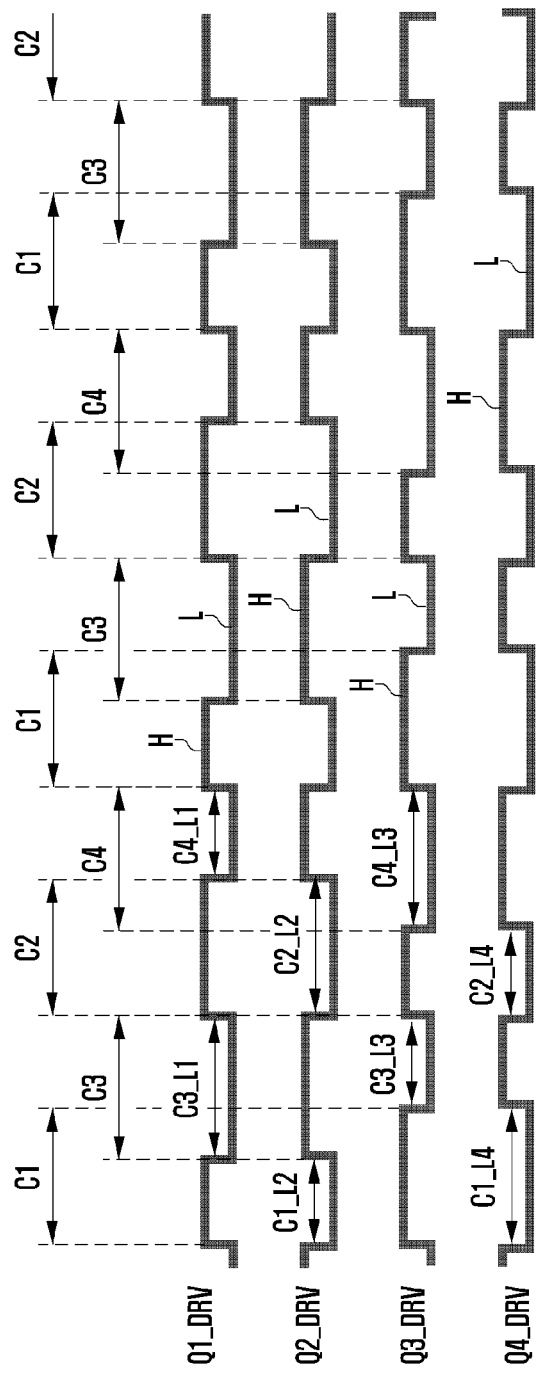
FIG. 12 may be a waveform diagram illustrating first to fourth gate signals when power transmitting device operates in a PWM mode according to an embodiment of the disclosure.

FIG. 12 may be a waveform diagram illustrating the first to fourth gate signals Q1_DRV, Q2_DRV, Q3_DRV, and Q4_DRV when the power transmitting device 302 operates in PWM mode according to an embodiment of the disclosure. For example, FIG. 12, as a diagram of output wave-forms of the dead time circuit 1050 in FIG. 10, represents pulses applied to the gates of the first to fourth switches Q1, Q2, Q3, and Q4.

Referring to FIG. 12, when the power transmitting device (e.g., power transmitting device 302 in FIG. 10) operates in PWM mode, the driving timing for the first to fourth gate signals Q1_DRV, Q2_DRV, Q3_DRV, and Q4_DRV generated from the Tx control circuit (e.g., Tx control circuit 530 in FIG. 10) may be divided into a first period C1, a second period C2, a third period C3, and a fourth period C4. According to various embodiments, at least some of the first period C1, the second period C2, the third period C3, and the fourth period C4 may overlap each other. For example, a portion of the first period C1 and a portion of the third period C3 overlaps each other. For example, a portion of the second period C2 and a portion of the fourth period C4 overlaps each other.

The first period C1 and the second period C2 may be periods defined in relation to the first gate signal Q1_DRV and the third gate signal Q3_DRV. When operating in PWM mode, the Tx control circuit 530 may alternately repeat an operation corresponding to the first period C1 and an operation corresponding to the second period C2.

The Tx control circuit 530, during the first period C1, may activate the first gate signal Q1_DRV and the third gate signal Q3_DRV (e.g., output in high state H), and deactivate the second gate signal Q2_DRV and the fourth gate signal Q4_DRV (e.g., output in low state L). During the first period C1, the duty cycle of the third gate signal Q3_DRV may be set to be greater than that of the first gate signal Q1_DRV. During the first period C1, the Tx control circuit 530 may set the length of a low period C1_L2 in which the second gate signal Q2_DRV is in low state L to be shorter than the length of a low period C1_L4 in which the fourth gate signal Q4_DRV is in low state.

The Tx control circuit 530, during the second period C2, may activate the first gate signal Q1_DRV and the third gate signal Q3_DRV (e.g., output in high state H), and deactivate the second gate signal Q2_DRV and the fourth gate signal Q4_DRV (e.g., output in low state L). During the second period C2, the duty cycle of the first gate signal Q1_DRV may be set to be greater than that of the third gate signal Q3_DRV. During the second period C2, the Tx control circuit 530 may set the length of a low period C2_L2 in which the second gate signal Q2_DRV is in low state to be longer than the length of a low period C2_L4 in which the fourth gate signal Q4_DRV is in low state.

The third period C3 and the fourth period C4 may be periods defined in relation to the second gate signal Q2_DRV and the fourth gate signal Q4_DRV. According to an embodiment, the third period C3 is a period between the first period C1 and the second period C2, and may overlap at least partially with the time corresponding to the first period C1. According to an embodiment, the fourth period C4 is a period after the second period C2, and may include a period at least partially overlapping the second period C2. When operating in PWM mode, the Tx control circuit 530 may alternately repeat an operation corresponding to the third period C3 and an operation corresponding to the fourth period C4.

During the third period C3, the Tx control circuit 530 may activate the second gate signal Q2_DRV and the fourth gate signal Q4_DRV (e.g., output in high state H), and may activate the third gate signal Q3_DRV (e.g., output in high state H) and deactivate the first gate signal Q1_DRV (e.g., output in low state L) for a portion of the period. During the third period C3, the duty cycle of the second gate signal Q2_DRV may be set to be greater than that of the fourth gate signal Q4_DRV. During the third period C3, the Tx control circuit 530 may set the length of a low period C3_L1 in which the first gate signal Q1_DRV is in low state L to be longer than the length of a low period C3_L3 in which the third gate signal Q3_DRV is in low state.

During the fourth period C4, the Tx control circuit 530 may activate the second gate signal Q2_DRV and the fourth gate signal Q4_DRV (e.g., output in high state H), and may activate the first gate signal Q1_DRV (e.g., output in high state H) and deactivate the third gate signal Q3_DRV (e.g., output in low state L) for a portion of the period. During the fourth period C4, the duty cycle of the second gate signal Q2_DRV may be set to be less than that of the fourth gate signal Q4_DRV. During the fourth period C4, the Tx control circuit 530 may set the length of a low period C4_L1 in which the first gate signal Q1_DRV is in low state to be shorter than the length of a low period C4_L3 in which the third gate signal Q3_DRV is in low state.

According to various embodiments, when operating in PWM mode, the Tx control circuit 530 may repeatedly perform in sequence an operation corresponding to the first period C1, an operation corresponding to the third period C3, an operation corresponding to the second period C2, and an operation corresponding to the fourth period C4, as defined above.

Figure 13:
FIG. 13 may be graphs illustrating operations of first to fourth switches in response to first to fourth gate signals when a power transmitting device operates in a PWM mode according to an embodiment of the disclosure.

FIG. 13 may be graphs illustrating operations of the first to fourth switches Q1, Q2, Q3, and Q4 in response to the first to fourth gate signals Q1_DRV, Q2_DRV, Q3_DRV, and Q4_DRV when the power transmitting device 302 operates in PWM mode according to an embodiment of the disclosure.

Referring to FIG. 13, a graph 1301 in FIG. 13 indicates the current Ids1 of the first switch (e.g., first switch Q1 in FIG. 10) according to the first gate signal (e.g., first gate signal Q1_DRV in FIG. 12). A graph 1302 in FIG. 13 indicates the current Ids2 of the second switch (e.g., second switch Q2 in FIG. 10) according to the second gate signal (e.g., second gate signal Q2_DRV in FIG. 12). A graph 1303 in FIG. 13 indicates the current Ids3 of the third switch (e.g., third switch Q3 in FIG. 10) according to the third gate signal (e.g., third gate signal Q3_DRV in FIG. 12). A graph 1304 in FIG. 13 indicates the current Ids4 of the fourth switch (e.g., fourth switch Q4 in FIG. 10) according to the fourth gate signal (e.g., fourth gate signal Q4_DRV in FIG. 12). A graph 1305 in FIG. 13 indicates the driving voltage V_Dry applied across the transmission coil (e.g., transmission coil 311L in FIG. 10).

With reference to FIG. 13, as for the first to fourth gate signals Q1_DRV, Q2_DRV, Q3_DRV, and Q4_DRV when the power transmitting device (e.g., power transmitting device 302 in FIG. 10) operates in PWM mode, as described with reference to FIG. 12, the pulses according to the first period C1, the third period C3, the second period C2, and the fourth period C4 may be repeated in sequence.

The power transmitting device 302 operating in PWM mode according to various embodiments causes each gate signal to have a phase difference from each other and causes the duty cycle of each gate signal to be repeatedly increased and decreased, which facilitates securing a dead time period for zero voltage switching when the first to fourth switches Q1, Q2, Q3, and Q4 are turned on, so that switching noise can be reduced. Next, a description will be given of zero voltage switching of the first to fourth switches Q1, Q2, Q3, and Q4 according to various embodiments of the disclosure.

A portion indicated by 1301-1 of the graph 1301 indicates that a reverse current flows temporarily through the body diode before the first switch Q1 is turned on and a forward current flows, which means that the first switch Q1 has zero voltage switching when turned on.

A portion indicated by 1302-1 of the graph 1302 indicates that a reverse current flows temporarily through the body diode before the second switch Q2 is turned on and a forward current flows, which means that the second switch Q2 has zero voltage switching when turned on.

A portion indicated by 1303-1 of the graph 1303 indicates that a reverse current flows temporarily through the body diode before the third switch Q3 is turned on and a forward current flows, which means that the third switch Q3 has zero voltage switching when turned on.

A portion indicated by 1304-1 of the graph 1304 indicates that a reverse current flows temporarily through the body diode before the fourth switch Q4 is turned on and a forward current flows, which means that the fourth switch Q4 has zero voltage switching when turned on.

The PWM driving method of the power transmitting device 302 according to various embodiments can facilitate zero voltage switching when the first to fourth switches Q1, Q2, Q3, and Q4 are turned on, prevent reliability deterioration issues due to current asymmetry of the first to fourth switches Q1, Q2, Q3, and Q4, and avoid the issue of increasing the root-mean-square (RMS) value. For example, referring to the period 1310 in FIG. 13, it is seen that the current Ids3 of the third switch Q3 is relatively larger than the current Ids1 of the first switch Q1 and a current asymmetry occurs. However, referring to the period 1320 after the period 1310 in FIG. 13, it can be seen that the current Ids3 of the third switch Q3 is relatively smaller than the current Ids1 of the first switch Q1 and the current asymmetry phenomenon is reversed. Such current asymmetry and compensation thereof may be because the duty cycle of each of the first to fourth gate signals Q1_DRV, Q2_DRV, Q3_DRV, and Q4_DRV repeats increasing and decreasing. According to an embodiment, the PWM driving method of the power transmitting device 302 maintains the currents of individual switches (e.g., first to fourth switches Q1, Q2, Q3, and Q4) uniformly, and thus it can prevent a potential heating problem that may occur due to asymmetric currents and stably transfer power to the power receiving device 301.

Figure 14:
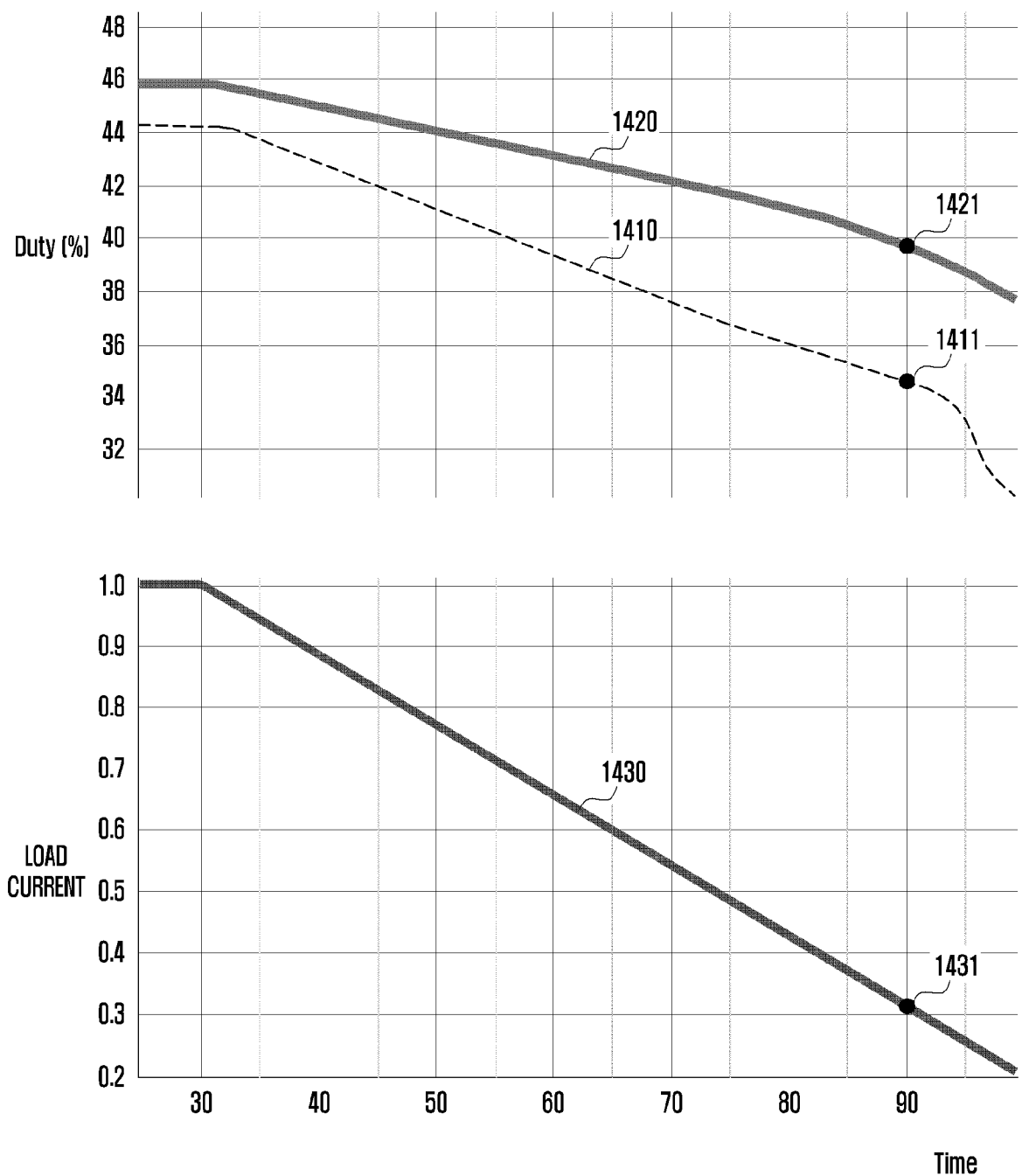
FIG. 14 is a graph for depicting a PWM driving method of a power transmitting device according to an embodiment of the disclosure.

FIG. 14 is a graph for depicting a PWM driving method of the power transmitting device 302 according to an embodiment of the disclosure.

Referring to FIG. 14, a graph 1410 indicates the duty cycle of the gate signal in the PWM driving method according to the comparative examples shown in FIGS. 8 and 9. In FIG. 14, a graph 1420 indicates the duty cycle of the gate signal according to the disclosure. A graph 1430 in FIG. 14 represents the load current supplied to the charger 560 of the power receiving device 301.

Referring to FIG. 14, the PWM driving method of the power transmitting device (e.g., power transmitting device 302 in FIG. 10) according to various embodiments can control the transmission power according to a wide range of the load current only by adjusting a relatively small amount of the duty cycle. For example, as shown by portion 1431 of the graph 1430, when the load current supplied to the charger (e.g., charger 560 in FIG. 10) of the power receiving device (e.g., power receiving device 301 in FIG. 10) is about 0.3 A, the PWM driving method according to the comparative example controls the gate signal with a duty cycle of about 34% (refer to portion 1411 of the graph 1410). If the load current is lower than about 0.3 A, the power transmitting device 302 according to the comparative example should make the duty cycle of the gate signal lower than about 34%; but if the duty cycle is lowered to less than about 30%, hard switching is more likely to occur, so adjusting the duty cycle may be significantly constrained.

On the other hand, in the PWM driving method of the power transmitting device 302 according to various embodiments, even when the gate signal is controlled with a duty cycle of about 40% (refer to portion 1421 of the graph 1420), the load current can cover about 0.3 A, in which case it is possible to secure more margin for adjusting the power of the power signal (e.g., duty cycle of about 30% to about 40%) even if the load current is lowered further, and communication stability can be improved during in-band communication through capacitor switching.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device capable of wireless power transfer, the electronic device comprising:
a power source;
a transmission coil;
a full bridge inverter electrically connected to the power source and the transmission coil; and
a control circuit configured to:
communicate with an external device through the transmission coil, and
control the full bridge inverter to transmit a power signal through the transmission coil,
wherein the full bridge inverter comprises:
a first switch that is electrically connected to one end of the transmission coil, the first switch being turned on in response to a first gate signal of the control circuit,
a second switch that is electrically connected to the one end of the transmission coil, the second switch being turned on in response to a second gate signal of the control circuit,
a third switch that is electrically connected to the other end of the transmission coil, the third switch being turned on in response to a third gate signal of the control circuit, and
a fourth switch that is electrically connected to the other end of the transmission coil, the fourth switch being turned on in response to a fourth gate signal of the control circuit,
wherein the control circuit is further configured to:
receive a first control signal requesting to lower a power of the power signal to less than a specified power from the external device, and
adjust a duty cycle of each of the first to fourth gate signals in response to the first control signal, and switch to a pulse width modulation (PWM) driving state in which an operation corresponding to a first period and an operation corresponding to a second period are alternately repeated,
wherein, during the first period, the control circuit is further configured to activate the first gate signal and the third gate signal, and deactivate the second gate signal and the fourth gate signal, where the duty cycle of the third gate signal is set to be greater than the duty cycle of the first gate signal, and
wherein, during the second period, the control circuit is further configured to activate the first gate signal and the third gate signal, and deactivate the second gate signal and the fourth gate signal, where the duty cycle of the first gate signal is set to be greater than the duty cycle of the third gate signal.

2. The electronic device of claim 1,
wherein during the first period, the control circuit is further configured to set a length of a low period in which the second gate signal is deactivated to be shorter than a length of a low period in which the fourth gate signal is deactivated, and
wherein during the second period, the control circuit is further configured to set the length of the low period in which the second gate signal is deactivated to be longer than the length of the low period in which the fourth gate signal is deactivated.

3. The electronic device of claim 1,
wherein the control circuit is further configured to further perform an operation corresponding to a third period and an operation corresponding to a fourth period in the PWM driving state, where the third period is a period set between the first period and the second period and the fourth period is, as a period after the second period, a period at least partially overlapping the second period,
wherein the control circuit is further configured to repeat in sequence the operations corresponding respectively to the first period, third period, second period, and fourth period,
wherein the control circuit is further configured to activate the second gate signal and the fourth gate signal during the third period, and activate the third gate signal and deactivate the first gate signal during some of the third period, and
wherein the control circuit is further configured to activate the second gate signal and the fourth gate signal during the fourth period, and activate the first gate signal and deactivate the third gate signal during some of the fourth period.

4. The electronic device of claim 3, wherein the control circuit is further configured to set the duty cycle of the second gate signal to be greater than the duty cycle of the fourth gate signal during the third period.

5. The electronic device of claim 3, wherein the control circuit is further configured to set the duty cycle of the second gate signal to be less than the duty cycle of the fourth gate signal during the fourth period.

6. The electronic device of claim 1, wherein the control circuit is further configured to:
receive a second control signal requesting to change the power of the power signal to be greater than or equal to the specified power from the external device, and
fix the duty cycle of each of the first to fourth gate signals in response to the second control signal, and switch to a pulse frequency modulation (PFM) driving state in which output frequencies of the first to fourth gate signals are adjusted.

7. The electronic device of claim 1, wherein the control circuit comprises:
a demodulation circuit that obtains an error signal by demodulating the first control signal received through the transmission coil from the external device;
a control compensation circuit that generates a control voltage by proportionally and integrally (PI) compensating the error signal;
a limiting circuit that determines a maximum value of the control voltage and generates a duty control signal;
a pulse generator that generates first to fourth pulses based on the maximum value of the control voltage and the duty control signal; and
a dead time circuit that generates the first to fourth gate signals by applying a dead time of a specified length to the first to fourth pulses.

8. The electronic device of claim 7, wherein, in case that the control circuit is switched to the PWM driving state, the pulse generator is configured to:
calculate a difference value between the control voltage and the maximum value of the control voltage, and
apply a dead time having a length proportional to a magnitude of the difference value to the first to fourth pulses.

9. The electronic device of claim 8, wherein the pulse generator is further configured to:
apply a first dead time having a length proportional to the magnitude of the difference value to the first pulse and the fourth pulse between a falling edge of the first pulse and a rising edge of the fourth pulse, and
apply a second dead time having a length proportional to the magnitude of the difference value to the third pulse and the second pulse between a falling edge of the third pulse and a rising edge of the second pulse.

10. The electronic device of claim 9, wherein the pulse generator is further configured to alternately perform:
an operation of applying the first dead time to the first pulse and the fourth pulse, and
an operation of applying the second dead time to the second pulse and the third pulse.

11. An electronic device capable of wireless power transfer, the electronic device comprising:
a power source;
a transmission coil;
a full bridge inverter electrically connected to the power source and the transmission coil; and
a control circuit configured to:
communicate with an external device through the transmission coil, and
control the full bridge inverter to transmit a power signal through the transmission coil,
wherein the full bridge inverter comprises:
a first switch that is electrically connected to one end of the transmission coil and is turned on in response to a first gate signal of the control circuit,
a second switch that is electrically connected to the one end of the transmission coil and is turned on in response to a second gate signal of the control circuit,
a third switch that is electrically connected to the other end of the transmission coil and is turned on in response to a third gate signal of the control circuit, and
a fourth switch that is electrically connected to the other end of the transmission coil and is turned on in response to a fourth gate signal of the control circuit,
wherein the control circuit is further configured to:
receive a first control signal requesting to lower a power of the power signal to less than a specified power from the external device, and
adjust a duty cycle of each of the first to fourth gate signals in response to the first control signal, and switch to a pulse width modulation (PWM) driving state in which an operation corresponding to a first period and an operation corresponding to a second period are alternately repeated, and wherein the control circuit comprises:
a demodulation circuit that obtains an error signal by demodulating the first control signal received through the transmission coil from the external device,
a control compensation circuit that generates a control voltage by proportionally and integrally (PI) compensating the error signal,
a limiting circuit that determines a maximum value of the control voltage and generates a duty control signal,
a pulse generator that generates first to fourth pulses based on the maximum value of the control voltage and the duty control signal, and
a dead time circuit that generates the first to fourth gate signals by applying a dead time of a specified length to the first to fourth pulses.

12. The electronic device of claim 11, wherein, in case that the control circuit is switched to the PWM driving state, the pulse generator is configured to:
calculate a difference value between the control voltage and the maximum value of the control voltage, and
apply a dead time having a length proportional to a magnitude of the difference value to the first to fourth pulses.

13. The electronic device of claim 12, wherein the pulse generator is further configured to:
apply a first dead time having a length proportional to the magnitude of the difference value to the first pulse and the fourth pulse between a falling edge of the first pulse and a rising edge of the fourth pulse, and
apply a second dead time having a length proportional to the magnitude of the difference value to the third pulse and the second pulse between a falling edge of the third pulse and a rising edge of the second pulse.

14. The electronic device of claim 13, wherein the pulse generator is further configured to alternately perform:
an operation of applying the first dead time to the first pulse and the fourth pulse, and
an operation of applying the second dead time to the second pulse and the third pulse.

15. The electronic device of claim 11,
wherein, during the first period, the control circuit is further configured to activate the first gate signal and the third gate signal, and deactivate the second gate signal and the fourth gate signal, where the duty cycle of the third gate signal is set to be greater than the duty cycle of the first gate signal, and
wherein, during the second period, the control circuit is further configured to activate the first gate signal and the third gate signal, and deactivate the second gate signal and the fourth gate signal, where the duty cycle of the first gate signal is set to be greater than the duty cycle of the third gate signal.

16. The electronic device of claim 11,
wherein during the first period, the control circuit is further configured to set a length of a low period in which the second gate signal is deactivated to be shorter than a length of a low period in which the fourth gate signal is deactivated, and
wherein during the second period, the control circuit is further configured to set the length of the low period in which the second gate signal is deactivated to be longer than the length of the low period in which the fourth gate signal is deactivated.

17. The electronic device of claim 11,
wherein the control circuit is further configured to further perform an operation corresponding to a third period and an operation corresponding to a fourth period in the PWM driving state, where the third period is a period set between the first period and the second period and the fourth period is, as a period after the second period, a period at least partially overlapping the second period,
wherein the control circuit is further configured to repeat in sequence the operations corresponding respectively to the first period, third period, second period, and fourth period,
wherein the control circuit is further configured to:
activate the second gate signal and the fourth gate signal during the third period, and
activate the third gate signal and deactivate the first gate signal during some of the third period, and
wherein the control circuit is further configured to:
activate the second gate signal and the fourth gate signal during the fourth period, and
activate the first gate signal and deactivate the third gate signal during some of the fourth period.

18. The electronic device of claim 17, wherein the control circuit is further configured to set the duty cycle of the second gate signal to be greater than the duty cycle of the fourth gate signal during the third period.

19. The electronic device of claim 17, wherein the control circuit is further configured to set the duty cycle of the second gate signal to be less than the duty cycle of the fourth gate signal during the fourth period.

20. The electronic device of claim 11, wherein the control circuit is further configured to:
receive a second control signal requesting to change the power of the power signal to be greater than or equal to the specified power from the external device, and
fix the duty cycle of each of the first to fourth gate signals in response to the second control signal, and switch to a PFM driving state in which output frequencies of the first to fourth gate signals are adjusted.

* * * * *